US007996758B2

(12) United States Patent
van Wyk et al.

(10) Patent No.: US 7,996,758 B2
(45) Date of Patent: Aug. 9, 2011

(54) METHODS AND APPARATUS FOR STORING DATA ASSOCIATED WITH AN ELECTRONIC FORM

(75) Inventors: Adriaan van Wyk, Strubensvalley (ZA); Ben Fourie, Radiokop (ZA); Schalk de Jager, Weltevreden Park (ZA); Pieter Janson, Centurion (ZA); Natachya Raath, Vanderbijlpark (ZA); Lenz le Roux, Radiokop (ZA); Wynand du Toit, Little Falls (ZA); Olaf Wagner, Issaquah, WA (US)

(73) Assignee: Sourcecode Technologies Holding, Inc., Redmond, WA (US)

( * ) Notice: Subject to any disclaimer, the term of this patent is extended or adjusted under 35 U.S.C. 154(b) by 936 days.

(21) Appl. No.: 11/556,044

(22) Filed: Nov. 2, 2006

(65) Prior Publication Data
US 2007/0136358 A1    Jun. 14, 2007

Related U.S. Application Data

(60) Provisional application No. 60/733,330, filed on Nov. 2, 2005, provisional application No. 60/733,329, filed on Nov. 2, 2005, provisional application No. 60/733,328, filed on Nov. 2, 2005.

(51) Int. Cl.
*G06F 17/00* (2006.01)
(52) U.S. Cl. ................. 715/223; 715/234; 715/205
(58) Field of Classification Search .............. 715/223, 715/234, 205
See application file for complete search history.

(56) References Cited

U.S. PATENT DOCUMENTS

| 5,404,294 | A | 4/1995 | Karnick |
| 5,450,537 | A | 9/1995 | Hirai et al. |
| 5,535,321 | A | 7/1996 | Massaro et al. |
| 5,572,643 | A | 11/1996 | Judson |
| 5,600,789 | A | 2/1997 | Parker |
| 5,640,577 | A | 6/1997 | Scharmer |
| 5,701,451 | A | 12/1997 | Rogers et al. |
| 5,706,434 | A | 1/1998 | Kremen et al. |
| 5,710,883 | A | 1/1998 | Hong et al. |

(Continued)

OTHER PUBLICATIONS

Written Opinion of the International Searching Authority for International Application No. PCT/US06/60470 dated Mar. 3, 2008.

(Continued)

*Primary Examiner* — Doug Hutton
*Assistant Examiner* — Nathan Hillery
(74) *Attorney, Agent, or Firm* — K&L Gates LLP

(57) ABSTRACT

The disclosed system empowers technical and non technical users to author logical business objects, author intelligent business forms, and create automated workflows. The logical business objects include data definitions and methods from existing and new data sources. An object broker interprets the business object definition and brokers data/information and method calls to the data sources. The intelligent business forms are created by an information worker in a rich web-based tooling environment. Each form is intelligent enough to recognize other forms that it might co-exist with on a single page, as well as how to react based on events that occur on these related forms. The automated workflow tools include process discovery features that assist users during the process identification phase. The tools assist both technical and non technical users to identify processes within the organization, including supporting solution artifacts such as forms, rules, actions, outcomes and business objects involved. Process modeling features include the ability to combine defined artifacts into a process model that can be published into a runtime environment where it can be executed and used by business users in the organization.

18 Claims, 13 Drawing Sheets

U.S. PATENT DOCUMENTS

| | | | |
|---|---|---|---|
| 5,710,918 | A | 1/1998 | Lagarde et al. |
| 5,734,837 | A * | 3/1998 | Flores et al. ............... 705/7 |
| 5,737,592 | A | 4/1998 | Nguyen et al. |
| 5,774,887 | A | 6/1998 | Wolff et al. |
| 5,781,720 | A | 7/1998 | Parker |
| 5,883,639 | A | 3/1999 | Walton et al. |
| 5,999,911 | A | 12/1999 | Berg |
| 6,084,585 | A | 7/2000 | Kraft et al. |
| 6,192,380 | B1 | 2/2001 | Light et al. |
| 6,199,079 | B1 | 3/2001 | Gupta et al. |
| 6,345,278 | B1 | 2/2002 | Hitchcock |
| 6,460,042 | B1 | 10/2002 | Hitchcock |
| 6,470,227 | B1 | 10/2002 | Rangachari |
| 6,507,865 | B1 | 1/2003 | Hanson et al. |
| 6,574,631 | B1 | 6/2003 | Subramanian |
| 6,591,272 | B1 | 7/2003 | Williams |
| 6,633,915 | B1 | 10/2003 | Hashimoto |
| 6,694,362 | B1 | 2/2004 | Secor et al. |
| 6,772,407 | B1 * | 8/2004 | Leymann et al. ............... 717/100 |
| 6,789,252 | B1 * | 9/2004 | Burke et al. ............... 717/100 |
| 6,833,847 | B1 | 12/2004 | Boegner et al. |
| 6,845,378 | B1 | 1/2005 | Pauly et al. |
| 6,871,327 | B2 | 3/2005 | Polk |
| 6,950,831 | B2 | 9/2005 | Haley |
| 6,957,186 | B1 | 10/2005 | Guheen et al. |
| 6,966,053 | B2 | 11/2005 | Paris |
| 6,970,844 | B1 | 11/2005 | Bierenbaum |
| 6,973,626 | B1 | 12/2005 | Lahti |
| 6,978,379 | B1 | 12/2005 | Goh et al. |
| 6,981,028 | B1 | 12/2005 | Rawat |
| 6,983,421 | B1 | 1/2006 | Lahti |
| 6,996,800 | B2 | 2/2006 | Lucassen |
| 7,003,729 | B1 | 2/2006 | Rajala |
| 7,024,415 | B1 | 4/2006 | Kreiner |
| 7,076,411 | B2 | 7/2006 | Santori |
| 7,080,066 | B1 | 7/2006 | Scheurich et al. |
| 7,111,300 | B1 | 9/2006 | Salas et al. |
| 7,155,496 | B2 | 12/2006 | Froyd |
| 7,155,720 | B2 | 12/2006 | Casati et al. |
| 7,159,185 | B1 | 1/2007 | Vedula et al. |
| 7,159,188 | B2 | 1/2007 | Stabb et al. |
| 7,174,342 | B1 | 2/2007 | Scheurich et al. |
| 7,184,967 | B1 | 2/2007 | Mital et al. |
| 7,191,391 | B2 | 3/2007 | Takashima |
| 7,200,811 | B1 | 4/2007 | Takashima |
| 7,203,699 | B2 | 4/2007 | Bellamy |
| 7,206,998 | B2 | 4/2007 | Pennell |
| 7,234,105 | B2 | 6/2007 | Bezrukov |
| 7,240,323 | B1 | 7/2007 | Desai |
| 7,272,820 | B2 | 9/2007 | Klianev |
| 7,313,757 | B2 | 12/2007 | Bradley et al. |
| 7,353,248 | B1 | 4/2008 | Kirkpatrick |
| 7,376,891 | B2 | 5/2008 | Hitchock |
| 7,430,524 | B2 | 9/2008 | Shah |
| 7,500,597 | B2 | 3/2009 | Mann |
| 7,725,356 | B2 | 5/2010 | Shah |
| 7,734,999 | B2 | 6/2010 | Leung |
| 7,752,607 | B2 | 7/2010 | Larab |
| 7,827,492 | B2 | 11/2010 | Estrada |
| 2001/0044738 | A1 | 11/2001 | Elkin et al. |
| 2001/0047279 | A1 | 11/2001 | Gargone |
| 2002/0029218 | A1 * | 3/2002 | Bentley et al. ............... 707/100 |
| 2002/0052769 | A1 | 5/2002 | Navani et al. |
| 2002/0059264 | A1 | 5/2002 | Fleming et al. |
| 2002/0091736 | A1 | 7/2002 | Wall |
| 2002/0095423 | A1 | 7/2002 | Dessloch |
| 2002/0120628 | A1 | 8/2002 | Hitchcock |
| 2002/0188583 | A1 | 12/2002 | Rukavina |
| 2002/0194219 | A1 | 12/2002 | Bradley |
| 2003/0023953 | A1 | 1/2003 | Lucassen |
| 2003/0058277 | A1 | 3/2003 | Bowman-Amuah |
| 2003/0101022 | A1 | 5/2003 | Shah |
| 2003/0101023 | A1 | 5/2003 | Shah |
| 2003/0106039 | A1 | 6/2003 | Rosnow et al. |
| 2003/0115545 | A1 | 6/2003 | Hull |
| 2003/0120593 | A1 | 6/2003 | Bansal |
| 2003/0145018 | A1 | 7/2003 | Hitchcock |
| 2003/0149714 | A1 | 8/2003 | Casati et al. |
| 2003/0197733 | A1 | 10/2003 | Beauchamp et al. |
| 2003/0200527 | A1 * | 10/2003 | Lynn et al. ............... 717/102 |
| 2003/0200533 | A1 | 10/2003 | Roberts et al. |
| 2004/0002881 | A1 | 1/2004 | Hu et al. |
| 2004/0078373 | A1 | 4/2004 | Ghoneimy et al. |
| 2004/0122699 | A1 * | 6/2004 | Brito et al. ............... 705/1 |
| 2004/0199540 | A1 | 10/2004 | Nojima |
| 2004/0199863 | A1 | 10/2004 | Hitchcock |
| 2004/0237030 | A1 | 11/2004 | Malkin |
| 2004/0237040 | A1 | 11/2004 | Malkin |
| 2004/0260593 | A1 * | 12/2004 | Abraham-Fuchs et al. ...... 705/8 |
| 2004/0267595 | A1 | 12/2004 | Woodings |
| 2004/0267897 | A1 | 12/2004 | Hill et al. |
| 2005/0055634 | A1 | 3/2005 | Burns |
| 2005/0080756 | A1 | 4/2005 | Hitchcock |
| 2005/0086092 | A1 | 4/2005 | Kowalski |
| 2005/0086588 | A1 | 4/2005 | McGregor et al. |
| 2005/0125716 | A1 | 6/2005 | Cragun |
| 2005/0172212 | A1 * | 8/2005 | Birsa et al. ............... 715/500 |
| 2005/0216282 | A1 | 9/2005 | Chen et al. |
| 2005/0223392 | A1 * | 10/2005 | Cox et al. ............... 719/328 |
| 2005/0257267 | A1 | 11/2005 | Williams et al. |
| 2005/0273759 | A1 | 12/2005 | Lucassen |
| 2005/0283354 | A1 | 12/2005 | Ouimet |
| 2006/0005140 | A1 | 1/2006 | Crew |
| 2006/0031757 | A9 | 2/2006 | Vincent |
| 2006/0047672 | A1 | 3/2006 | Habon et al. |
| 2006/0064674 | A1 | 3/2006 | Olson |
| 2006/0075382 | A1 | 4/2006 | Shaburov |
| 2006/0080616 | A1 | 4/2006 | Vogel |
| 2006/0107229 | A1 | 5/2006 | Matthews et al. |
| 2006/0119619 | A1 | 6/2006 | Fagans et al. |
| 2006/0122975 | A1 | 6/2006 | Taylor et al. |
| 2006/0129906 | A1 | 6/2006 | Wall |
| 2006/0150107 | A1 | 7/2006 | Leung |
| 2006/0178890 | A1 | 8/2006 | Marechal |
| 2006/0184410 | A1 | 8/2006 | Ramamurthy et al. |
| 2006/0190310 | A1 | 8/2006 | Gudla et al. |
| 2006/0195816 | A1 | 8/2006 | Grandcolas |
| 2006/0225032 | A1 | 10/2006 | Klerk et al. |
| 2006/0248471 | A1 | 11/2006 | Lindsay et al. |
| 2007/0027733 | A1 | 2/2007 | Bolle |
| 2007/0038963 | A1 | 2/2007 | Moore |
| 2007/0073776 | A1 | 3/2007 | Kalalian et al. |
| 2007/0132779 | A1 | 6/2007 | Gilbert et al. |
| 2007/0139441 | A1 | 6/2007 | Lucas et al. |
| 2007/0165031 | A1 | 7/2007 | Gilbert et al. |
| 2007/0168060 | A1 | 7/2007 | Nixon et al. |
| 2007/0179641 | A1 | 8/2007 | Lucas et al. |
| 2007/0300236 | A1 | 12/2007 | Hing |
| 2008/0013860 | A1 | 1/2008 | Blanco |

OTHER PUBLICATIONS

Written Opinion of the International Searching Authority for International Application No. PCT/US08/58019 dated Jun. 2, 2008.
Written Opinion of the International Searching Authority for International Application No. PCT/US08/58020 dated Jun. 27, 2008.
Written Opinion of the International Searching Authority for International Application No. PCT/US08/54414 dated Jul. 25, 2008.
Written Opinion of the International Searching Authority for International Application No. PCT/US08/63087 dated Jul. 25, 2008.
Written Opinion of the International Searching Authority for International Application No. PCT/US08/64689 dated Aug. 7, 2008.
Cheng, An object-oriented organizational model to support dynamic role-based access control in electronic commerce, Elsevier Science B.V., 2000, pp. 1-13.
Smith et al., "Business Process Management: The Third Wave," ISBN 0929652339 Technical Excerpt Theory.
Office Action dated Jun. 23, 2010 from U.S. Appl. No. 11/556,047.
Office Action dated Aug. 18, 2008 from U.S. Appl. No. 11/556,029.
Office Action dated Mar. 16, 2009 from U.S. Appl. No. 11/556,029.
Office Action dated Sep. 3, 2009 from U.S. Appl. No. 11/556,029.
Office Action dated May 11, 2010 from U.S. Appl. No. 11/556,029.

Office Action dated Oct. 19, 2010 from U.S. Appl. No. 11/556,029.
Office Action dated May 21, 2010 from U.S. Appl. No. 11/556,023.
Office Action dated Aug. 31, 2010 from U.S. Appl. No. 11/556,040.
Office Action dated Feb. 1, 2010 from U.S. Appl. No. 11/555,996.
Office Action dated Jul. 19, 2010 from U.S. Appl. No. 11/555,996.
Office Action dated Sep. 30, 2010 from U.S. Appl. No. 11/556,016.
Office Action dated October29 2008 from U.S. Appl. No. 11/555,968.
Office Action dated May 12, 2009 from U.S. Appl. No. 11/555,968.
Office Action dated Feb. 2, 2010 from U.S. Appl. No. 11/555,968.
Office Action dated Aug. 2, 2010 from U.S. Appl. No. 11/556,001.
Office Action dated Feb. 16, 2010 from U.S. Appl. No. 11/556,001.
Lavana, et al. "Executable Workflows: a Paradigm for Collaborative Design on the Internet", 1997, ACM, p. 1-6.
Office Action dated Nov. 10, 2010 from U.S. Appl. No. 11/556,023.
Office Action dated Jan. 28, 2011 from U.S. Appl. No. 11/556,047.
Office Action dated Jan. 24, 2011 from U.S. Appl. No. 11/556,001.
Office Action dated Feb. 2, 2011 from U.S. Appl. No. 11/556,040.
EP Search Report dated Mar. 18, 2011.
"The Enterprise Objects Framework", Enterprise Objects Framework: Building Reusable Business Objects, XX, XX, Jul. 1, 1994, pp. 1-13, XP0020478548.
The Object People: "A White Paper: TOPLink for Java", Internet Citation, 1997, XP002098153, Retrieved from the Internet: URL:http://objectpeople.on.ca/Toplink/Java/ToplinkJavaWhitepaper.pdf [retrieved on Jan. 1, 1997].
"Sun simplifies database programming with Java Blend", Internet Citation, Aug. 21, 1997, XP002098152, Retrieved from the Internet: URL:http://java.sun.com:8081/pr/1997/august/pr970821-01.html [retrieved on Feb. 16, 1999].
Office Action dated Mar. 23, 2011 from U.S. Appl. No. 11/556,029.
Notice of Allowance dated Mar. 23, 2011 from U.S. Appl. No. 11/556,016.
Office Action dated Mar. 25, 2011, from U.S. Appl. No. 11/556,023.
Advisory Action dated Apr. 14, 2011, from U.S. Appl. No. 11/556,040.

* cited by examiner

METHODS AND APPARATUS FOR STORING DATA ASSOCIATED WITH AN ELECTRONIC FORM

PRIORITY CLAIM

This application claims priority to and the benefit of U.S. Provisional Patent Application Ser. No. 60/733,330 filed on Nov. 2, 2005, the entire contents of which is hereby incorporated; U.S. Provisional Patent Application Ser. No. 60/733,329 filed on Nov. 2, 2005, the entire contents of which is hereby incorporated; and U.S. Provisional Patent Application Ser. No. 60/733,328 filed on Nov. 2, 2005, the entire contents of which is hereby incorporated.

TECHNICAL FIELD

The present disclosure relates in general to automated workflows, and, in particular, to methods and apparatus for combining properties and methods from a plurality of different data sources.

BACKGROUND

As the number of information sources in organizations are growing, it is becoming increasingly difficult for consumers of the information to access it in a logical and structured way that relates to the traditional business objects they find familiar within their organizations (e.g., customers, assets, vendors, staff, etc). Data from existing systems is typically made available in a very technical way that requires significant technical and development skills to surface it to non technical users in the organization. No workable mechanism exists for non technical users to add information within a logical business object definition without involving technical or development skills. Similar, no workable solution exists today that allows both technical and non technical users of data to access their information from multiple data/information sources in a structured business object like way, while still maintaining the flexibility to add additional information definitions to the existing business objects or to create new business objects from existing or new data sources without the need for complex solution development.

Existing Enterprise Application Integration (EAI) systems combined with development tools can be used to custom develop solutions which make data and information more accessible, but these solutions are typically hard-coded and require significant technical and development skill to maintain and change over time. There is no workable way for non technical users to change the definition of the structured data (business objects) or to add additional information sources or fields within existing business object definitions that might already exist within their organizations. As an example, customer information might exist in a CRM system, ERP system and a custom issue tracking system. Existing EAI solutions assist in integrating data between these systems, but do not provide a mechanism to see a single definition of a customer as a logical business object regardless of where the information is being sourced from.

In addition, information workers are limited by the static business forms and information presented to them by the solution applications or custom developed applications they use on a day to day basis. Regardless of whether these forms are thin client (web or browser) based or thick/smart client (windows forms) based, the information worker's ability to add additional information on-demand to existing forms based on its current state and context, is extremely limited. Existing form technologies depend on a developer's involvement to bind the form to a data source (web service, database, etc) which populates the form with information based on a user event (click of a button, etc). Should the end user require additional information to be displayed on the form, he needs to rely on application specific pre-developed functionality that might allow him to see additional information or data fields on the forms. This implementation however depends on the logic encapsulated in the application or custom developed solution. The challenge remains to empower knowledge users to add additional information to a specific form, on demand, regardless of data source, without the need for technical or development involvement. Once these forms have been customized the underlying platform needs to store each users settings in a personalization system which will allow it to recognize the user the next time he access the form. The result being that each user has the ability to see his personalized view of a form.

Still further, existing process automation tools do not provide the necessary level of modeling tools and concepts to allow both technical and non technical users to author a completed business process solution in a single modeling/automation tooling environment. It is extremely difficult for business analysts, business/process owner's technical people to use a single solution which allows for all roles to work seamlessly together to rapidly discover, model and automate business processes within organizations. Existing workflow and business process automation tools are disconnected and do not allow for a single environment which brings technical and non technical business users together with a set of tools that deeply integrate the necessary building blocks.

SUMMARY

The disclosed system uses Enterprise Application Integration (EAI) sources (e.g., EAI software, Web Services, Application API) to provide a higher level framework (e.g., runtime broker and adapter services) with relating solution components (e.g., user interfaces and tooling) which empowers technical and non technical users to author logical business objects which includes data definitions (e.g., customer name, surname, etc) and actions or methods (e.g., save, load, delete) from existing or new data sources. Existing data sources include ERP, CRM, and/or custom developed systems in an organization while new data sources are created and maintained by the disclosed system. The disclosed system allows users to combine data from multiple sources into one single business object definition, including data and method/actions definitions. The new logical business object exposes a single logical data structure and view of the object as well as a single set of logical methods that are associated with the object.

The object broker (runtime engine) interprets the new object definition and brokers data/information and method calls to the data sources (or existing systems). Additional fields can be added to the new object definition. These additional fields are associated with the unique identifiers from the other data sources included in the new object definition. The actual data is preferably stored in a new data store where all data structure and action (e.g., create, load, update, delete as examples) are managed by the runtime broker. The result being a dynamic business object whose definition can be changed by either adding or removing data or actions without the need to involve technical or development resources to reconfigure or recompile the actual objects.

Existing systems are accessed through a service object component. The service object for a specific back-end system implements the base interface expected by the object broker.

This enables the object broker to use a consistent communication mechanism to exchange data and function calls with the applications it is integrating. The object Broker together with the service object interface provides the underlying infrastructure to exchange data, method calls and participation in supporting services such as transactions, compensations models, exception handling and role/security management. The object broker also includes a lightweight single-sign on implementation which allows it to use a single credential set to access multiple systems (each with their own authentication model).

Creating a new global form (changes reflected on all user's form instances) or personal form (changes and customizations saved on a per user basis) can be completed by the information worker in a rich web-based tooling environment, listing the potential data sources and user interface components. The underlying framework is also responsible for managing global and personal versions of forms seamlessly. In addition, the framework allows for the dynamic binding between business forms that has a logical relationship between each other. The forms are intelligent enough to recognize other forms that it might co-exist with on a single page, as well as how to react based on events that occur on these related forms. Logical relationships between forms can be the result of the relationship between the data being used on the page and/or it can be relationships defined by the user by means of simply linking events from one form to actions on another. For example, an order list form might have a relationship with a customer form which will allow it to automatically load a list of orders for a specific customer when the two forms are displayed on a single page. The order form is "aware" of its relationship with the customer form based on prior configuration information and can automatically display potential relationship configuration scenarios to the user when the form is placed on the same page as the customer form. In this case the relationship would stipulate that the order list form load itself whenever a customer number is entered into the customer number field on the customer form and the "find" button is clicked.

As a result, the information worker is empowered to change the layout of these pages on demand (e.g., add or remove forms on a page and define new relationships), which then in turn uses a personalization engine to store user specific changes and defined relationships between forms. The forms are not hard coded and can be changed on the fly. The disclosed system uses a model for dynamic form construction during runtime and design time, including data binding, event definitions and binding framework between events, controls and forms on a page.

The disclosed system also facilitates the creation of automated processes by both technical and non technical users. Process discovery features assist users during the process identification phase. The tools provided assist both technical and non technical users to identify processes within the organization, including supporting solution artifacts such as forms, rules, actions, outcomes and business objects involved. Process modeling features include the ability to combine the defined artifacts into a process model that can be published into a runtime environment where it can be executed and used by business users in the organization.

Additional features and advantages are described herein, and will be apparent from, the following Detailed Description and the figures.

DETAILED DESCRIPTION

Figure 1:
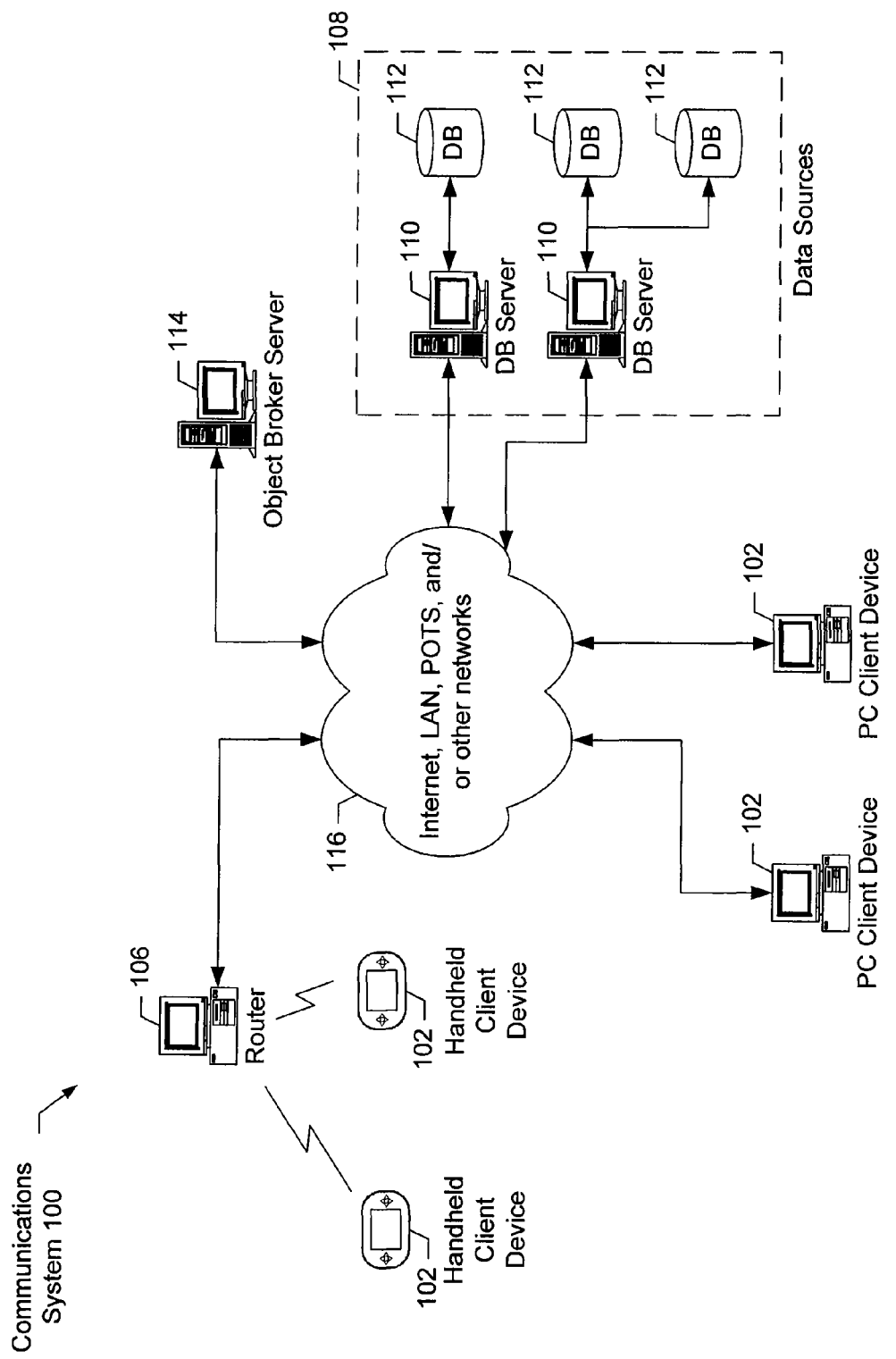
FIG. 1 is a high level block diagram of a communications system.

The present system is most readily realized in a network communications system. A high level block diagram of an exemplary network communications system 100 is illustrated in FIG. 1. The illustrated system 100 includes one or more client devices 102, one or more routers 106, and a plurality of different data sources 108 including database servers 110 and/or databases 112. Data transferred to/from the client devices 102 from/to the data sources 108 is managed by one or more object broker servers 114. Each of these devices may communicate with each other via a connection to one or more communications channels 116 such as the Internet and/or some other data network, including, but not limited to, any suitable wide area network or local area network. It will be appreciated that any of the devices described herein may be directly connected to each other instead of over a network.

The data sources 108 store a plurality of files, programs, and/or web pages in one or more databases 112 for use by the client devices 102. For example, a data source may store customer information. The data sources 108 may be connected directly to a database server 110 and/or via one or more network connections.

One data source 108 and/or one object broker server 114 may interact with a large number of other devices. Accordingly, each data source 108 and/or one object broker server 114 is typically a high end computer with a large storage capacity, one or more fast microprocessors, and one or more high speed network connections. Conversely, relative to a typical server, each client device 102 typically includes less storage capacity, a single microprocessor, and a single network connection.

Figure 2:
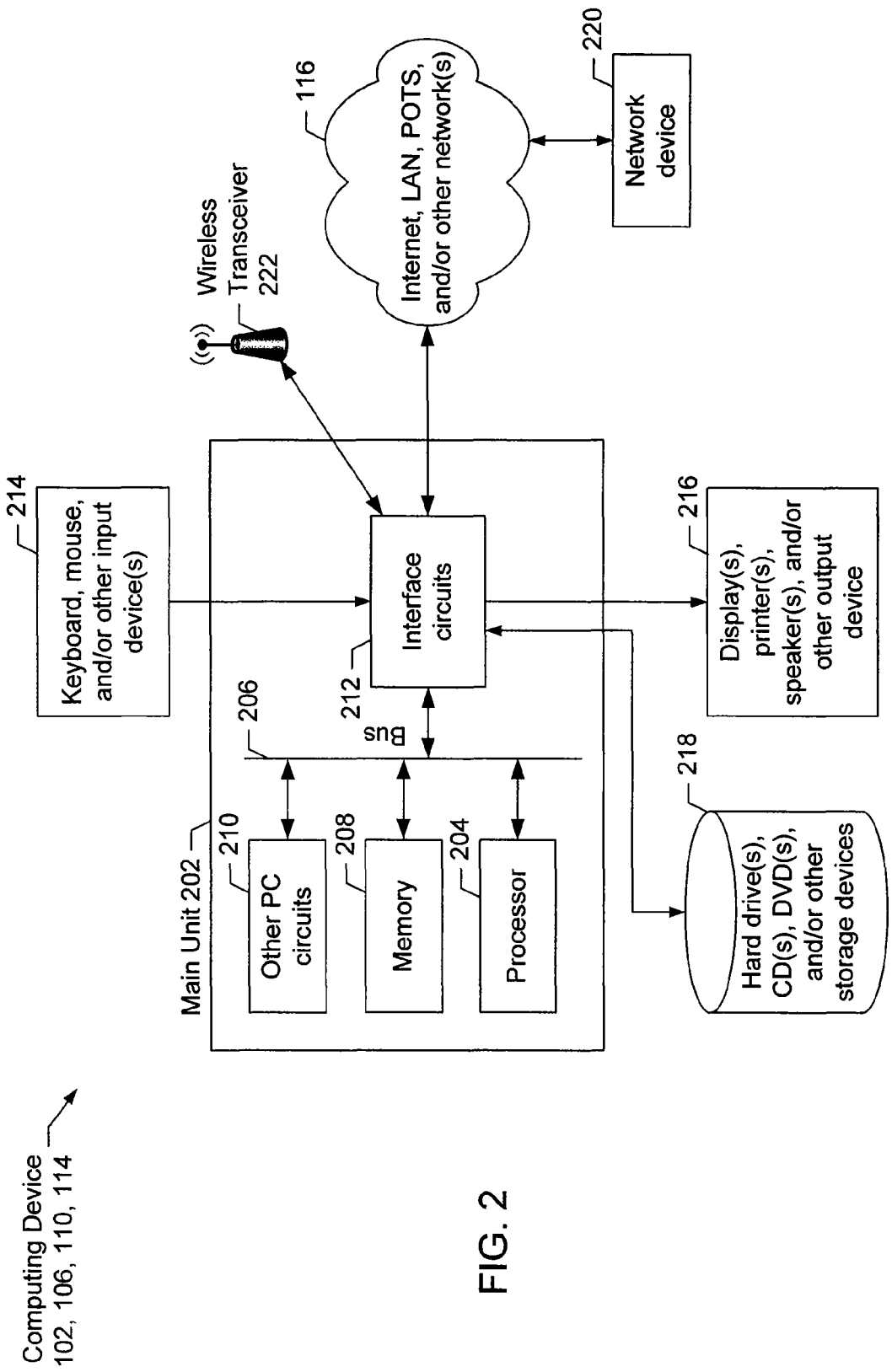
FIG. 2 is a more detailed block diagram showing one example of a computing device.

A more detailed block diagram of the electrical systems of a computing device (e.g., handheld client device 102, personal computer client device 102, router 106, database server 110, and/or object broker server 114) is illustrated in FIG. 2. Although the electrical systems of these computing devices may be similar, the structural differences between these devices are well known. For example, a typical handheld client device 102 is small and lightweight compared to a typical database server 110.

The example computing device 102, 106, 110, 114 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from another computing device and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the computing device 102, 106, 110, 114. For example, the display 216 may be used to display web pages received from the object broker server 114 including data from multiple data sources 108. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of suitable data.

The computing device 102, 104 may also exchange data with other network devices 220 via a connection to the network 116. The network connection may be any type of network connection, such as an Ethernet connection, digital subscriber line (DSL), telephone line, coaxial cable, etc. Users of the system 100 may be required to register with one or more of the computing devices 102, 106, 110, 114. In such an instance, each user may choose a user identifier (e.g., e-mail address) and a password which may be required for the activation of services. The user identifier and password may be passed across the network 116 using encryption built into the user's web browser. Alternatively, the user identifier and/or password may be assigned by the computing device 102, 106, 110, 114.

Figure 3:
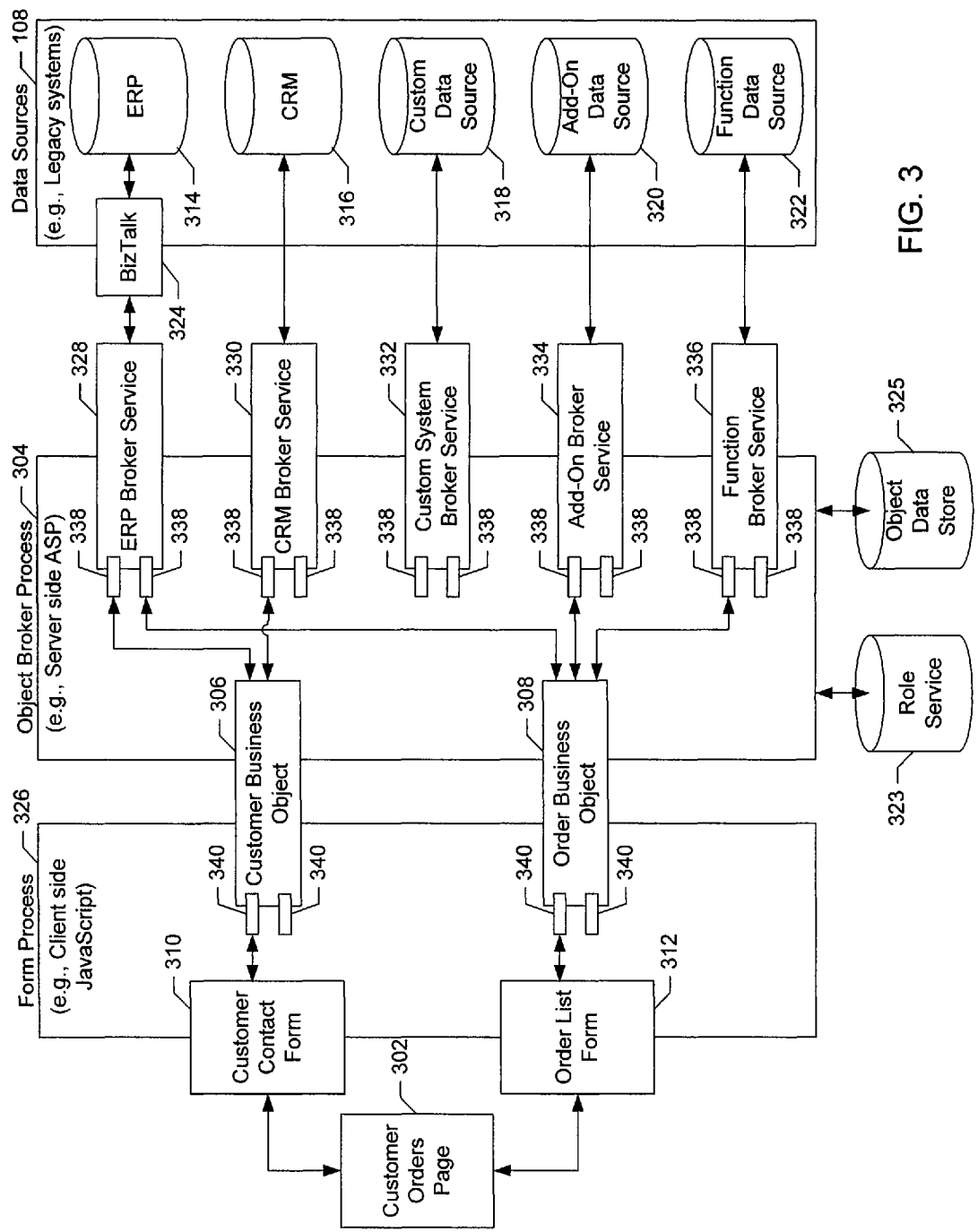
FIG. 3 is a block diagram showing example connections between a plurality of data sources and an electronic form via an object broker.

In one embodiment, a user at a client device 102 views and/or modifies data from a plurality of different data sources 108 via an interactive electronic form. An example block diagram showing connections between a plurality of data sources 108 and an electronic form 302 via an object broker process 304 is illustrated in FIG. 3. In general, the object broker process 304 (described in detail below with reference to FIG. 6) compiles data in a variety of different native formats from the different data sources 108 (e.g., different legacy database systems) into standardized business objects 306, 308 (e.g., in a declarative format such as XML). A user may then view the data using one or more electronic forms 302, 310, 312. In addition, the user may manipulate the data and/or add data via the electronic forms 302, 310, 312. In such instance, the object broker process 304 accepts the data via the business objects 306, 308 and stores the data back to the data sources 108 in the correct native format.

In this example, the data sources 108 include an enterprise resource planning (ERP) data source 314, a customer relationship management (CRM) data source 316, a custom data source 318, an add-on data source 320, and a function data source 322. In addition, a role service 323 and an object data store 325 are included in the system. Typically, an ERP data source 314 stores data related to accounts receivable, accounts payable, inventory, etc. Typically, a CRM data source 316 stores data related to leads, quotes, orders, etc. A custom data source 318 is a data source 108 that is not considered a standard commercial product. For example, a business may have a custom data source that stores real-time manufacturing information. Some data sources 108 may use and intermediary server for communications. For example, the ERP data source 314 uses a BizTalk server 324.

The add-on data source 320 stores data associated with form fields added by the user that are not supported by one of the other data sources 108. For example, a business may start up a frequent shopper card program and need to store a card number for each participant. Accordingly, a user may add a frequent buyer number field to an existing form containing legacy data. Because the existing data sources 108 in this example do not include a frequent buyer number field, the frequent buyer number field and associated data are stored by the add-on data source 320.

In order to manipulate data in a particular data source 108, the object broker process 304 preferably calls methods built into the associated data source 108. For example, each data source 108 typically includes methods to store/retrieve data to/from the data source 108 (e.g., the CRM data source may support a "LoadContact" method as described in detail below). In addition, the system 300 allows a user to author their own functions. For example, a user may need to apply a discount to certain customers. However, the existing data sources 108 may not include a method to calculate the discount. Accordingly, the user may author a "CalcDiscount" function as described below. User defined functions may use data from more than one data source 108. The definitions for these user defined functions is then stored in the function data source 322.

User defined functions may be created using a graphical user interface tool. For example, parameters for a user defined function may be defined by selecting a graphical representation of the parameter associated with a business object. Preferably, user defined functions are stored as snippets. Snippets include a structure portion that defines the function and a user interface portion that provides the user a way to test the function. For example, the structure portion may be stored as XML, and the user interface portion may be stored as HTML in the same file.

Some user defined functions may be executed by the client devices 102 thereby reducing communication with the server 110, 114. Other user defined functions may require server side execution. Preferably, a determination is made if a particular function is to be executes on the client side or the server side, and an indicator of this determination is stored with the function snippet. For example, user defined functions built from certain predefined primitives (e.g., add, multiply, loop, less than, etc.) may be determined to be executable by the client device 200, while other user defined functions that include database lookups (e.g., SQL statements) may be determined to be executable by a server 110, 114.

From a user's perspective, the data from the data sources 108 (as well as data calculated from data in the data sources 108 e.g., a discount) is viewed using one or more electronic forms 302, 310, 312. In addition, the user may manipulate the data and/or add data via the electronic forms 302, 310, 312. Forms 302, 310, 312 may be combined into pages 302 and one form may use data from more than one data source 108. For example, the customer orders page 302 combines the customer contact form 310 and the order list form 312 (as described in detail below with reference to FIG. 5). In addition, portions of forms and/or entire forms that are part of a larger page, may be locked so that only certain users can modify that portion of the form or page.

In order to facilitate forms 302, 310, 312 that combine data from different data sources 108, the system 300 employs an object broker process 304 (described in detail below with reference to FIG. 6) and a form process 326 (described in detail below with reference to FIG. 7). In one embodiment, the object broker process 304 is ASP code running on the object broker server 114 and the form process 326 is JavaScript running on a client device 102. The object broker process 304 compiles data in a variety of different native formats from the different data sources 108 into standardized business objects 306, 308 (e.g., XML files). In addition, the object broker process 304 accepts the data via the business objects 306, 308 and stores the data back to the data sources 108 in the correct native format.

More specifically, the object broker process 304 uses a plurality of broker services to communicate with the data sources 108. Preferably, one broker service is used for each data source 108. In this example, the object broker process 304 includes an ERP broker service 328, a CRM broker service 330, a custom broker service 332, an add-on broker service 334, and a function broker service 336. Each broker service 328, 330, 332, 334, 336 is designed to communicate with the associated data source 108 using the data source's native formats and protocols.

Each broker service 328, 330, 332, 334, 336 then automatically exposes the properties and methods of the associated data source 108 as standardized properties and methods 338 for use by the business objects 306, 308. For example, the ERP broker service 328 communicates with the ERP data source 314 via the BizTalk server 324 and exposes the ERP data source 314 properties and methods to the customer business object 306 and the order business object 308 as XML files. If new properties and/or methods become available from a data source 108, the associated broker service preferably detects these new properties and/or methods and automatically exposes the new properties and/or methods for use by the business objects 306, 308. The business objects 306, 308 may include some or all of the exposed properties and methods 338. Each business object 306, 308 then exposes its included properties and methods 340 to the form process 326.

The form process 326 calls business object methods 340 in response to form events and populates the forms 302, 310, 312 with data from the business object properties 340. For example, a user may press a "Load" button on the customer orders page 302, which causes the form process 326 to call one or more methods 340 exposed by the business objects 306, 308. This, in turn, causes the object broker process 304 to retrieve the appropriate data from one or more data sources 108. The data is then returned as properties of the business objects 306, 308, and the form process 326 uses the data to populate the forms 310, 312.

In addition, the form process 326 may store values to the business object properties 340, and call methods to have the new/modified data stored back to the appropriate data source 108 via the object broker process 304. For example, a from may accept a new value for a customer's address and call an UpdateContact method to have the new address stored to the appropriate data source 108.

Figure 4:
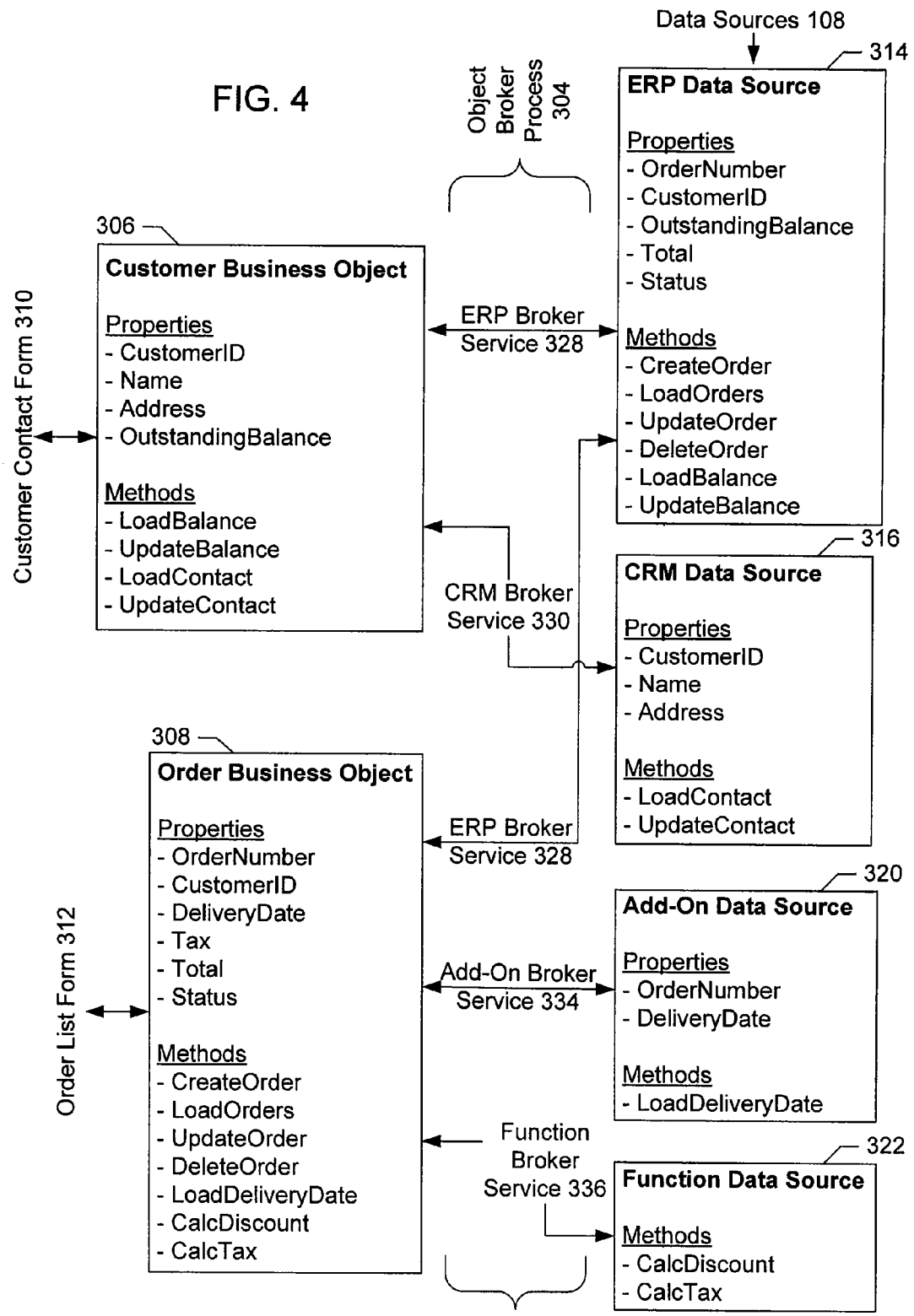
FIG. 4 is a block diagram showing example connections between data sources and business objects.

A more detailed block diagram showing these connections between the example data sources 108 and the example business objects 306, 308 is illustrated in FIG. 4. In this example, the customer business object 306 is connected to the ERP data source 314 and the CRM data source 316. The order business object 308 is connected to the ERP data source 314, the add-on data source 320, and the function data source 322. These logical connections may be defined in any suitable manner. For example, a graphical user interface may be used to allow a user to draw connection lines between graphical representations of the data sources 108 and graphical representations of the business objects 306, 308.

These logical connections are maintained by the object broker process 304. For example, data to populate the customer contact form 310 and the order list form 312 is brought into the customer business object 306 and the order business object 308 from the data sources 108 by the object broker process 304. Similarly, new and modified data from the customer contact form 310 and the order list form 312 is sent from the customer business object 306 and the order business object 308 to the data sources 108 by the object broker process 304. In addition, the role service 323 may generate a reduced object definition based on these full object definitions. For example, the role service 323 may retrieve a role associated with a particular user and a plurality of authorized properties and/or methods associated with that role. Unauthorized properties and/or methods are then removed from the business object definition (e.g., a user is not allowed to write to the customer business object, therefore the UpdateBalance and UpdateContact methods are removed).

The example customer business object 306 includes a customer ID property, a name property, an address property, an outstanding balance property, a load balance method, an update balance method, a load contact method, and an update contact method. The customer ID property in the customer business object 306 is connected to the customer ID property in the ERP data source 314 and/or the customer ID property in the CRM data source 316. The name property and the address property in the customer business object 306 are connected to the name property and the address property in the CRM data source 316. The outstanding balance property in the customer business object 306 is connected to the outstanding balance property in the ERP data source 314. The load balance method and the update balance method in the customer business object 306 are connected to the load balance method and the update balance method in the ERP data source 314. The load contact method and the update contact method in the customer business object 306 are connected to the load contact method and the update contact method in the CRM data source 316.

The example order business object 308 includes an order number property, a customer ID property, a delivery date property, a tax property, a total property, a status property, a create order method, a load orders method, an update order method, a delete order method, a calc discount method, and a calc tax method. The order number property and the status property in the order business object 308 are connected to the order number property and the status property in the ERP data source 314. The customer ID property in the order business object 308 is connected to the customer ID property in the ERP data source 314 and/or the customer ID property in the add-on data source 320. The delivery date property, tax property, and total property in the order business object 308 are connected to the delivery date property, tax property, and total property in the add-on data source 320. The create order method, load orders method, update orders method, and delete order method in the order business object 308 are connected to the create order method, load orders method, update orders method, and delete order method in the ERP data source 314. The calc discount method and the calc tax method in the order business object 308 are connected to the calc discount method and the calc tax method in the function data source 322. It will be appreciated that the names of the properties and/or methods in the data sources 108 need not be the same as the corresponding names of the properties and/or methods in the business objects 306, 308.

Figure 5:
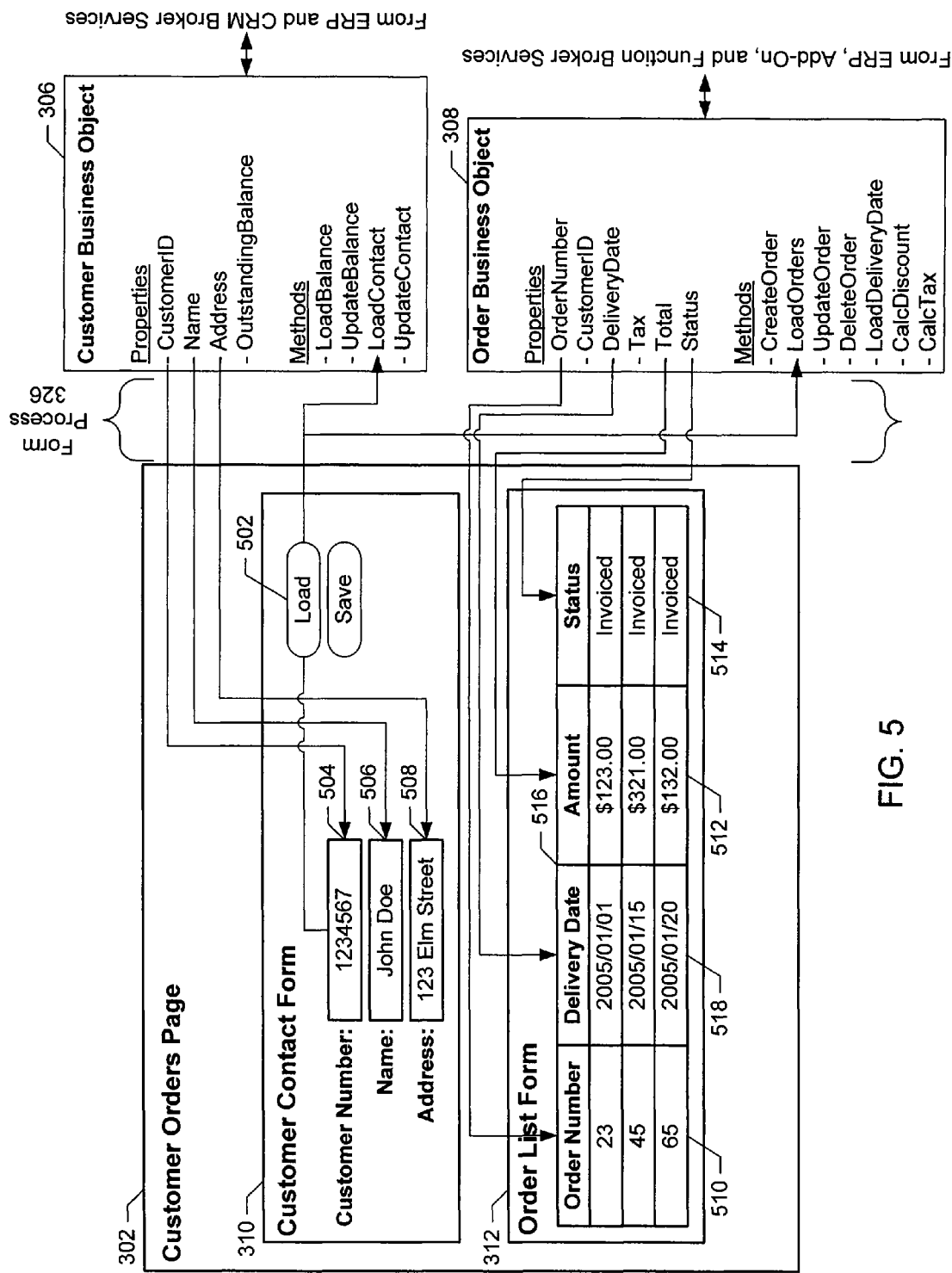
FIG. 5 is a more detailed view of an example customer orders page and the associated connections to a customer business object and an order business object.

A more detailed view of the customer orders page 302 and the associated connections to the customer business object 306 and the order business object 308 are illustrated in FIG. 5. In this example, if the user presses a load button 502, binder software associated with the form process 326 calls the load contact method of the customer business object 306 and the load orders method of the order business object 308. For both method calls, the form process 326 supplies the value of the customer number field 504 from the customer contact form 310. Alternatively, the form process 326 may obtain the value of the customer number field 504 from the customer ID property of the customer business object 306 and/or the order business object 308. These logical connections may be defined in any suitable manner. For example, a graphical user interface may be used to allow a user to draw connection lines between the forms 302, 310, 312 and graphical representations of the business objects 306, 308. Preferably, the user may design forms using only a web browser. For example, an asynchronous Java and XML (AJAX) interface may be used.

When the form process 326 calls the load contact method of the customer business object 306 with the value of the customer number field 504 as a parameter (e.g., using AJAX), the object broker process 304 translates the method call into the native language of the associated data source 108 and retrieves the associated data from the data source 108 in its native format. Specifically, the CRM broker service 330 invokes the native load contact method of the CRM data source 316 and receives the contact's name and address back from the CRM data source 316. The CRM broker service 330 then stores the name and contact data to the customer business object 306. For example, the CRM broker service 330 may be ASP code running on the object broker server 114 that sends an XML file (or another standardized file) to the form process 326, which is JavaScript code running on the client device 102 that is displaying the customer contact form 310. Once the customer business object 306 is updated with the new name and address data, the form process 326 populates the name field 506 and the address field 508 of the customer contact form 310. Using this method, an HTML form may be updated without posting the entire form to a server and re-rendering the entire HTML form.

Similarly, when the form process 326 calls the load orders method of the order business object 308 with the value of the customer number field 504 as a parameter, the object broker process 304 translates the method call into the native language of the associated data source 108 and retrieves the associated data from the data source 108 in its native format. Specifically, the ERP broker service 328 invokes the native load orders method of the ERP data source 314 and receives a list of order numbers, an associated list of totals, and an associated list of statuses back from the ERP data source 314. For example, the data may be returned as a database table. These values will eventually be used to fill out the order number column 510, the amount column 512, and the status column 514 of the order table 516 in the order list form 312. However, in this example, the delivery date column 518 cannot be supplied by the ERP data source 314, because the ERP data source 314 does not have this information.

The delivery date data is stored in the add-on data source 320 (i.e., the delivery date field was added later by the user). Accordingly, when the form process 326 calls the load orders method of the order business object 308 with the value of the customer number field 504 as a parameter, the add-on broker service 334 invokes the load delivery date method of the add-on data source 320 and receives a list of delivery dates and associated order numbers back from the add-on data source 320. The object broker process 304 and/or the form process 326 correlate the delivery dates with the amount data and status data received from the ERP data source 314 using the order number data that is common to both lists.

The object broker process 304 then stores the list of order numbers, the associated list of delivery dates, the associated list of totals, and the associated list of statuses to the order business object 308. For example, the ERP broker service 328, the add-on broker service 334, and/or other software (e.g., ASP code running on the object broker server 114) may send an XML file (or another standardized file) to the form process 326 (e.g., JavaScript running on the client device 102). Once the order business object 308 is updated with the new data, the form process 326 populates the order table 516 in the order list form 312.

Figure 6:
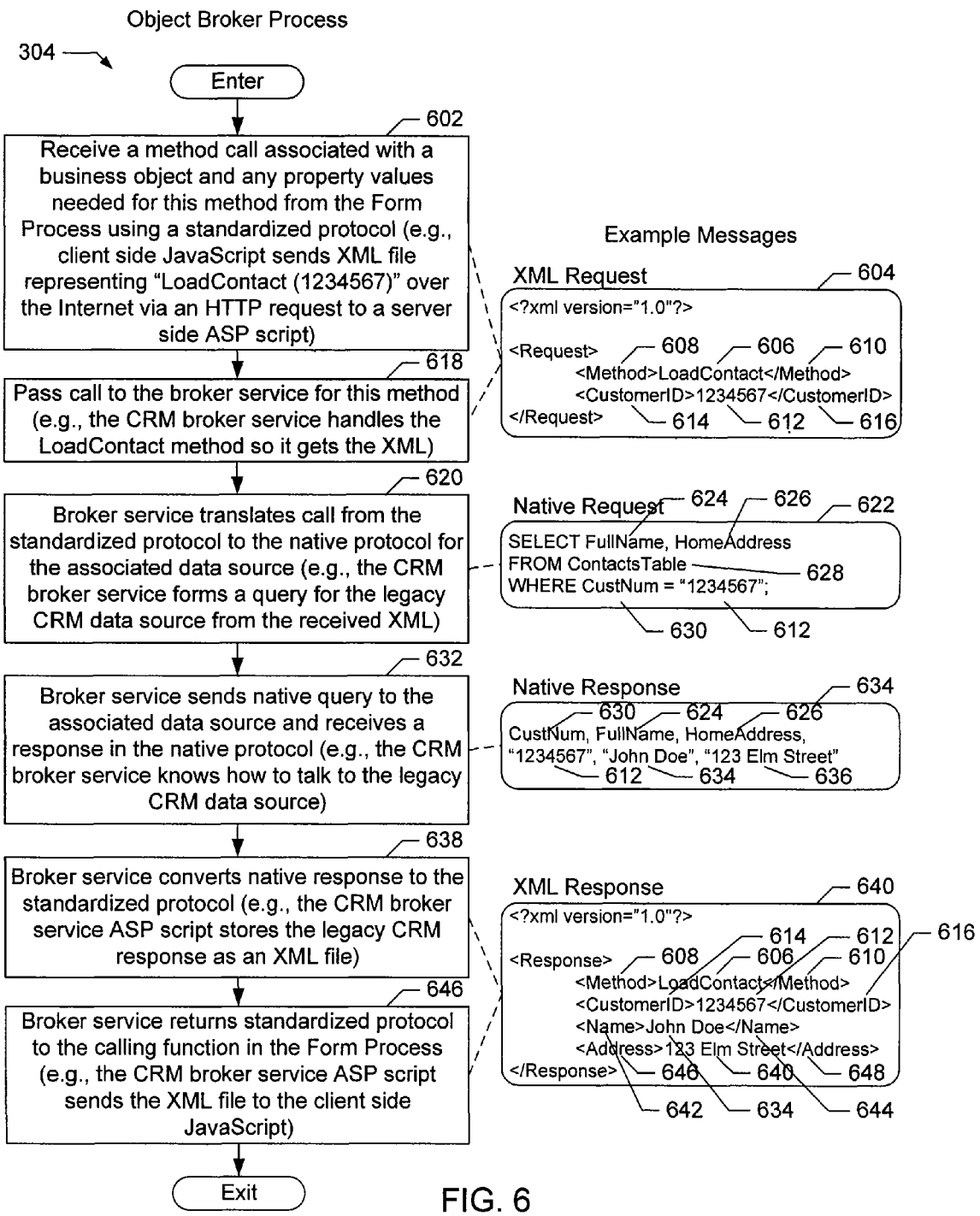
FIG. 6 is a flowchart of an example object broker process.

A flowchart of an example object broker process 304 is illustrated in FIG. 6. Preferably, the object broker process 304 is embodied in one or more software programs which is stored in one or more memories and executed by one or more processors. For example, the object broker process 304 may be ASP code (or any other type of software) running on the object broker server 114. Although the object broker process 304 is described with reference to the flowchart illustrated in FIG. 6, it will be appreciated that many other methods of performing the acts associated with object broker process 304 may be used. For example, the order of many of the steps may be changed, and some of the steps described may be optional.

Generally, the object broker process 304 receives standardized method calls from the form process 326 and converts the standardized method calls into native method calls. The object broker process 304 then sends the native method calls to the associated data source(s) 108 and receives one or more native responses from the data source(s) 108. The object broker process 304 then converts the native response(s) to standardized response(s) and sends the standardized response(s) to the calling form process 326.

More specifically, the object broker process 304 receives a method call from the form process 326 using a standardized protocol (block 602). The standardized method call is associated with a business object and includes any property values (i.e., parameters) needed for this method. For example, a client device 102 may be displaying the customer orders page 302 as an HTML document. Using an on Blur event trigger, the client device 102 may run JavaScript code that sends an XML file 604 representing "LoadContact(1234567)" over the Internet 116 via an HTTP request to an ASP script running on the object broker server 114. It will be appreciated that any suitable protocols may be used instead of HTML, JavaScript, XML, HTTP, and/or ASP. For example, VBScript may be used instead of JavaScript, and Perl may used instead of ASP.

The example XML request 604 includes the "LoadContact" method call 606 delimited by an opening "Method" tag 608 and a closing "Method" tag 610. In addition, the example XML request 604 includes the "CustomerID" property value 612 delimited by an opening "CustomerID" tag 614 and a closing "CustomerID" tag 616.

The object broker process 304 then passes the standardized method call to the broker service associated with the method call (block 618). For example, the object broker process 304 may send the XML file 604 containing the LoadContact method 606 call to the CRM broker service 330.

The broker service associated with the method call then translates the method call from the standardized protocol to the native protocol for the associated data source 108 (block 620). For example, the CRM broker service 330 may form a native request 622 for the CRM data source 316 from the received XML file 604. The native request 622 may use any protocol. For example, the native request 622 may be a SQL query that knows the CRM data source 316 holds the customer contact data in a "FullName" field 624 and a "HomeAddress" field 626 of a "ContactsTable" 628 indexed by a "CustNum" field 630.

The broker service associated with the method call then sends the native query to the associated data source 108 and receives a native response from the data source 108 (block 632). For example, the CRM broker service 330 may be an ASP script running on the object broker server 114 that sends the native request 622 to the CRM data source 316 as a SQL query and receives a native response 634 in the form of a comma-delimited list. In this example, the native response 634 includes the name value 634 and the address value 636 of the contact associated with the "CustomerID" property value 612.

The broker service then converts the native response back to the standardized protocol (block 638). For example, the CRM broker service 330 may wait for a SQL response from the CRM data source 316 and generate an associated XML response 640. In this example, the XML response 640 includes all of the information from the original XML request 604 (i.e., the "LoadContact" method call 606 delimited by an opening "Method" tag 608 and a closing "Method" tag 610 and the "CustomerID" property value 612 delimited by an opening "CustomerID" tag 614 and a closing "CustomerID" tag 616). In addition, the XML response 640 includes the name value 634 delimited by an opening "Name" tag 642 and a closing "Name" tag 644, as well as the address value 640 delimited by an opening "Address" tag 646 and a closing "Address" tag 648.

The broker service then sends the standardized response to the calling function in the form process 326 (block 646). For example, the CRM broker service 330 may send the XML response 640 to a JavaScript associated with the customer orders page 302 on a client device 102. As described below, the form process 326 may then use the XML response 640 to populate the HTML based customer orders page 302.

Figure 7:
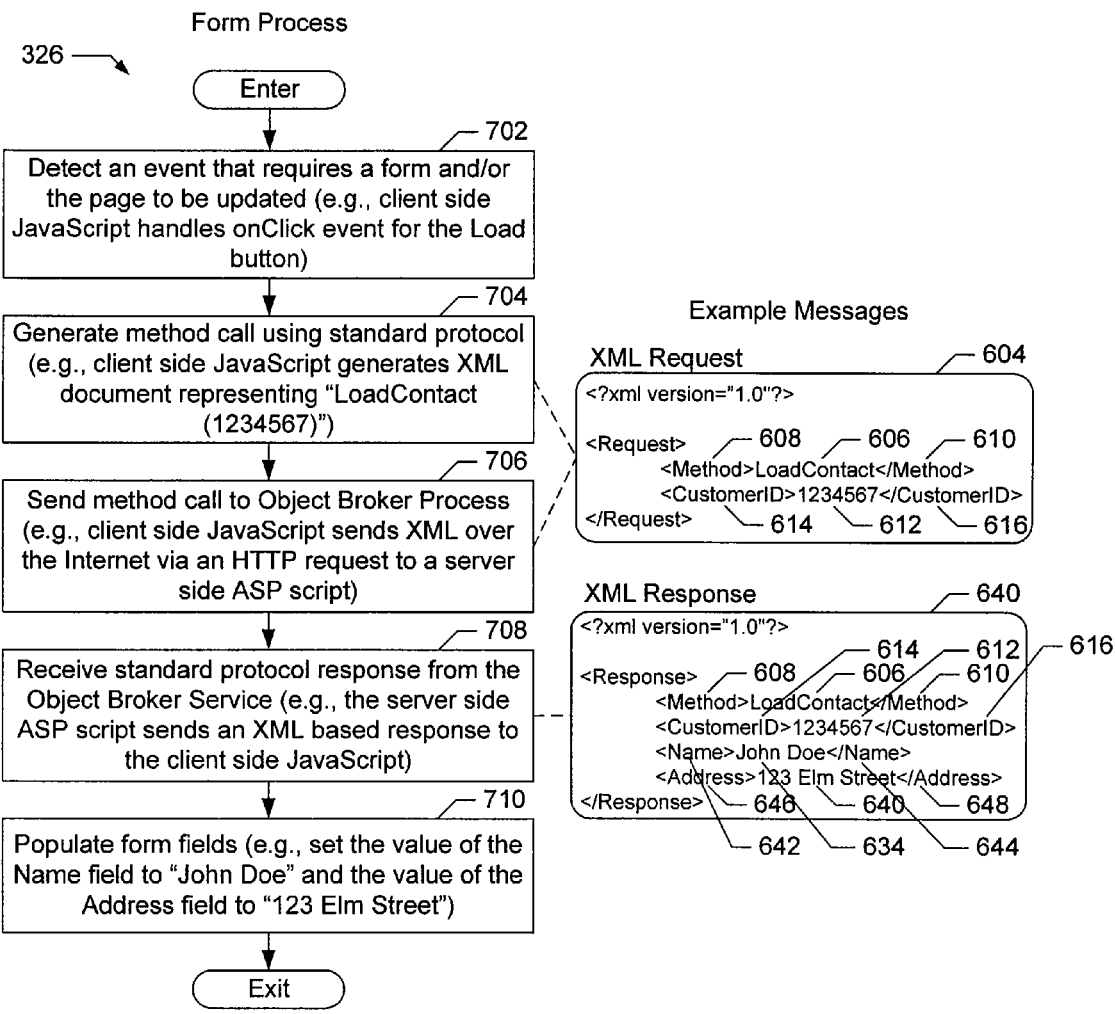
FIG. 7 is a flowchart of an example form process.

A flowchart of an example form process 326 is illustrated in FIG. 7. Preferably, the form process 326 is embodied in one or more software programs which is stored in one or more memories and executed by one or more processors. For example, the form process 326 may be JavaScript code (or any other type of software) running on a client device 102. Although the form process 326 is described with reference to the flowchart illustrated in FIG. 7, it will be appreciated that many other methods of performing the acts associated with form process 326 may be used. For example, the order of many of the steps may be changed, and some of the steps described may be optional.

Generally, the form process 326 detects events associated with a form (e.g., the HTML customer orders page 302) and sends standardized method calls (e.g., XML request 604) to the object broker process 304. When the form process 326 receives the standardized response(s) (e.g., XML response 640) back from the object broker process 304, the form process 326 may then use the standardized response(s) to populate the form (e.g., the HTML customer orders page 302).

More specifically, the form process 326 detects an event that requires a form and/or page to be updated (block 702). For example, the form process 326 may be JavaScript code running on a client device 102 in association with the customer orders page 302. When a user presses the load button 502 on the customer contact form 310, the form process 326 detects the onClick event associated with the load button 502 and executes a portion of the JavaScript code associated with this onClick event (i.e., the event handler).

When the event handler is executed, the form process 326 generates a suitable method call in the standard protocol (block 704). For example, the client device 102 may run JavaScript code that generates the XML file 604 representing "LoadContact(1234567)". As described above, the example XML request 604 includes the "LoadContact" method call 606 delimited by an opening "Method" tag 608 and a closing "Method" tag 610. In addition, the example XML request 604 includes the "CustomerID" property value 612 delimited by an opening "CustomerID" tag 614 and a closing "CustomerID" tag 616.

The form process 326 then sends the standardized method call to the object broker process 304 (block 706). For example, the client device 102 may send the XML request 604 over the Internet 116 via an HTTP request to an ASP script running on the object broker server 114. The object broker process 304 then communicates with the associated data sources 108 using the native protocols and sends the form process 326 a standardized response (block 708). For example, the client side JavaScript associated with the form process 326 may receive the XML response 640 from the server side ASP script associated with the object broker process 304.

As described above, the example XML response 640 includes all of the information from the original XML request 604 (i.e., the "LoadContact" method call 606 delimited by an opening "Method" tag 608 and a closing "Method" tag 610 and the "CustomerID" property value 612 delimited by an opening "CustomerID" tag 614 and a closing "CustomerID" tag 616). In addition, the XML response 640 includes the name value 634 delimited by an opening "Name" tag 642 and a closing "Name" tag 644, as well as the address value 640 delimited by an opening "Address" tag 646 and a closing "Address" tag 648. The form process 326 may then use the standardized response to populate the client's form (block 710). For example, the client side JavaScript may populate the name field 506 and the address field 508 of the HTML based customer contact form 310.

Figure 8:
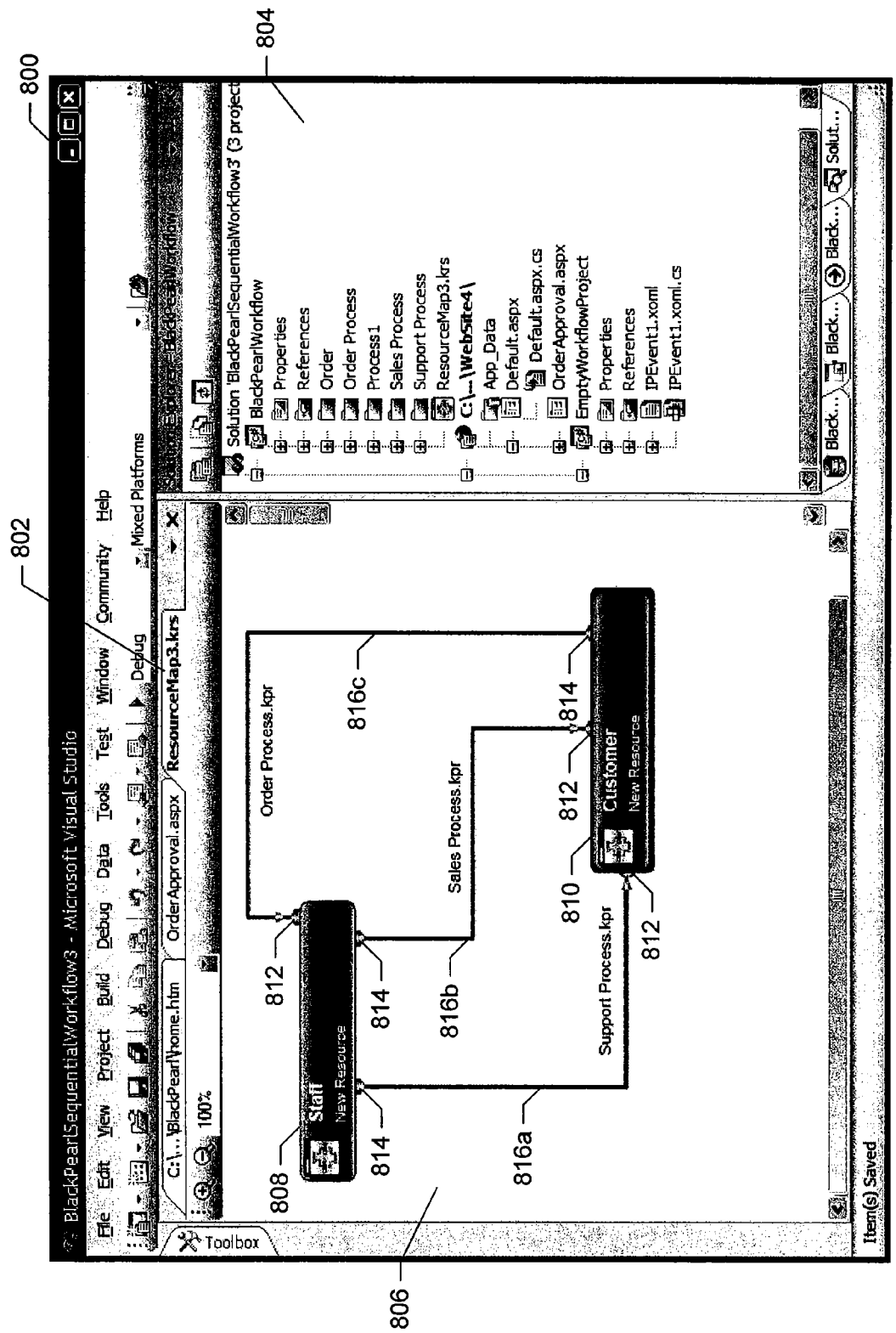
FIG. 8 is a screenshot of an example workflow design tool that allows a user to define a resource map.

A workflow design tool 800 that allows a user to define a resource map 802 is illustrated in FIG. 8. In this example, the workflow design tool 800 includes a file explorer section 804 and a design canvas 806. The file explorer section 804 allows the user to find and organize a plurality of files associated with the work flow. The design canvas 806 allows the user to draw a graphical representation of the resource map 802. In this example, a resource map 802 is shown that includes a staff object 808 and a customer object 810. The staff object 808 and the customer object 810 each include one or more input nodes 812 and one or more output nodes 814. Input nodes 812 are connected to output nodes 814 by process arrows 816. In this example, a support process 816a and a sales process 816b each come out of the staff object 808 and into the customer object 810. Similarly, an order process 816c comes out of the customer object 810 and into the staff object 808.

By defining workflows in terms of known resources (e.g., the staff object 808 and the customer object 810) and the interactions between those resources (e.g., the customer object 810 needs support from the staff object 808), the workflow designer can discover and design each process by starting at a high level and drilling down to underlying processes and automated workflows.

The resource maps 802 also allow for business object inheritance to show classes of a business object and that business object's child objects. Child objects may be associated with parent objects by modifying properties associated with the parent object and/or adding properties to the parent object. A single parent/child object combination might have a unique link definition within another resource on the canvas. For example, the parent customer object 810 may include a government customer child object and a commercial customer child object. The sales process 816b between the staff object 808 and the customer object 810 may be different depending on the type of customer object 810 (i.e., one sales process 816b for government customer's 810 and another sales process for commercial customers 810). Similarly, the staff object 808 may be a parent object with sales staff and support staff as two child resources.

Figure 9:
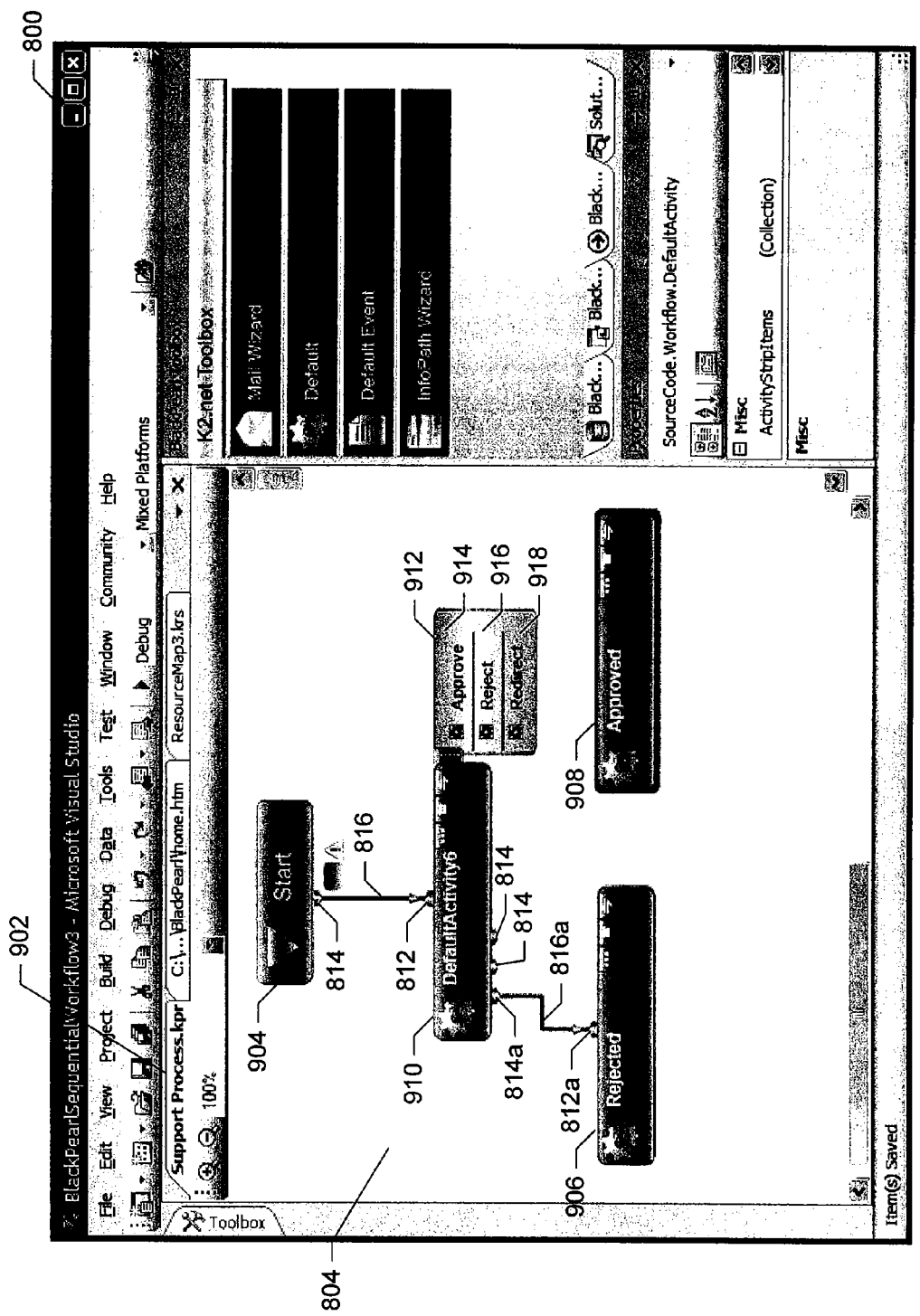
FIG. 9 is a screenshot of an example workflow design tool that allows a user to define a process map.

Another view of the workflow design tool 800 is illustrated in FIG. 9. In this view, the workflow design tool 800 is used to create a process map 902. In this example, the support process 816a is being defined. The example support process 816a includes a start step 904, a rejected step 906, and an approved step 908. In this example, only one of these steps 904, 906, 908 is to be performed. Accordingly, a new step 910 is being placed to select one of the three steps 904, 906, 908. The new step 910 includes a plurality of actions 912 and a plurality of corresponding output nodes 814. In this example, the new step 910 includes an approve action 914, a reject action 916, and a redirect action 918. The user connects the rejected output node 814a to the input node 812a of the rejected step 906 by dragging the process connector 816d. The associated line logic is automatically configured for the user.

Figure 10:
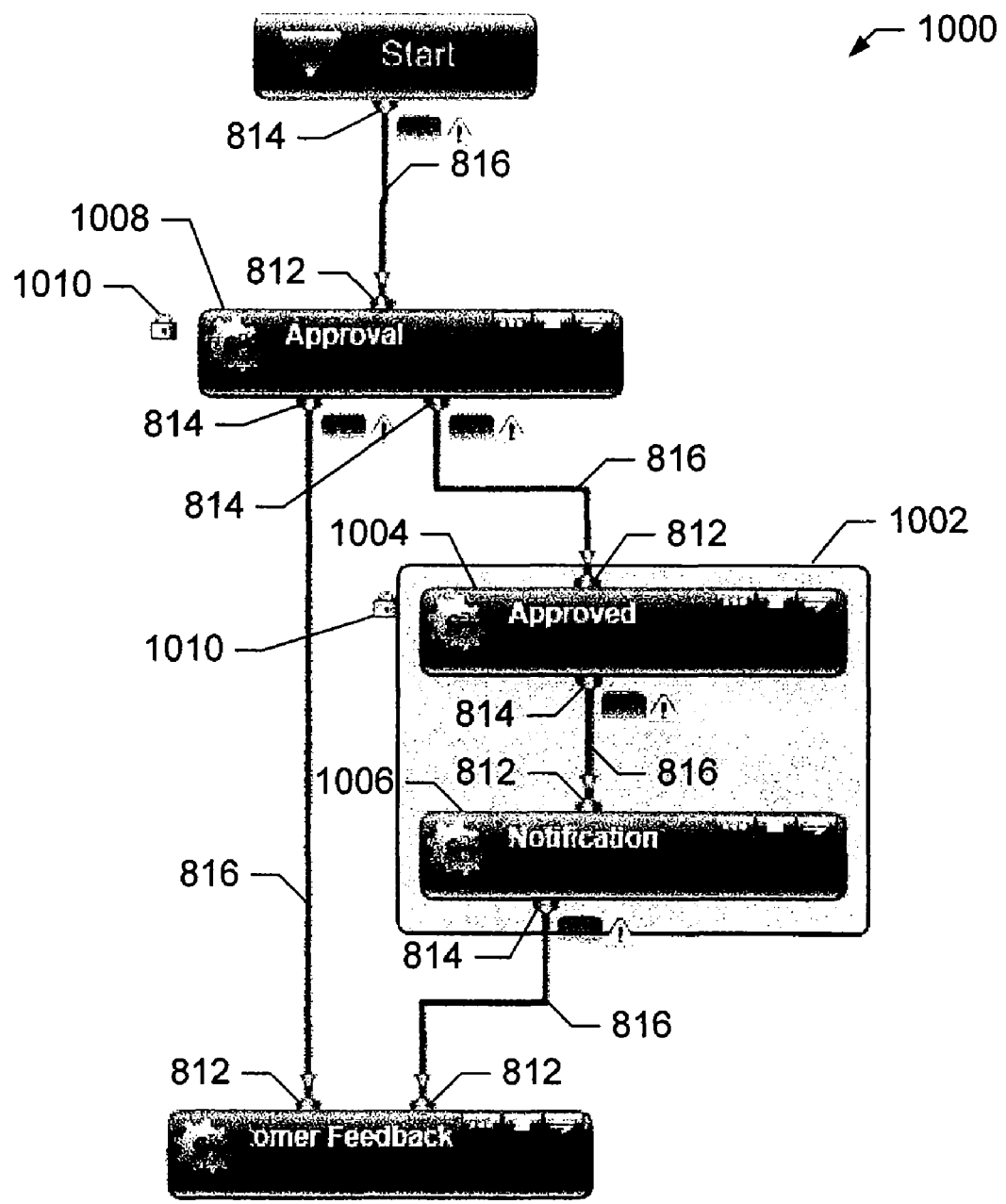
FIG. 10 is an example process map with a localized region of the process map highlighted.

Another process map 1000 is illustrated in FIG. 10. In this example process map 1000, a portion 1002 of the process map 1000 is highlighted. Specifically, an approved step 1004 and a notification step 1006 are included in a highlighted portion 1002. This portion 1002 may define a localized region of the process map 1000 while other portions of the process map 1000 (e.g., the rest of the process map 1000 in this example) are considered global regions. Using process inheritance, this localization of certain process regions allows a process owner to stay in control of the global process and still allow other users to customize certain portions 1002. For example, the global process may determine when something is approved and where the notification is routed, but one office in an organization may perform one set of actions in response to the approval and another office in the organization may perform another set of actions in response to the approval. Local processes may even include additional process steps that are specific to the localized region. The process 1000 is maintained under a single process definition such that changes to the global portion are automatically applied to all instances of the process 1000 and changes to the local portion 1002 are only applied to the associated localities.

In addition, individual process steps and/or portions 1002 may be locked. In this example, an approval step 1008 is individually locked, and the local portion 1002 is also locked. Each locked step and each locked portion includes a lock icon 1010 to indicate a locked status. By locking a process step 1008 and/or a process portion 1002, process designers can limit another user's ability to change certain configuration settings, add or remove dependencies, etc. from the defined and locked logic. The locking attributes can also be manipulated by wizards and templates in a programmatic way, allowing lower level building blocks to hide or lock their implementation logic.

A collaborative framework allows any process designer working within the workflow design tool 800 to visually share his design canvas 806 with another user across the network 116. A process designer can also initiate a voice or text conversation with the other parties to discuss the process currently being designed. In this manner, the process designer may involve other users in the process design using collaboration and application sharing tools. For example, by right clicking on the design canvas 806, the process designer may contact a particular person in the accounting department to ask that person who should be notified when a purchase is approved. Text messages and/or voice recordings between collaborators may also be saved to a database for later review. For example, when a process is being evaluated for redesign, the process designer may listen to a collaboration conversation to determine why a particular step was implemented the current way.

Figure 11:
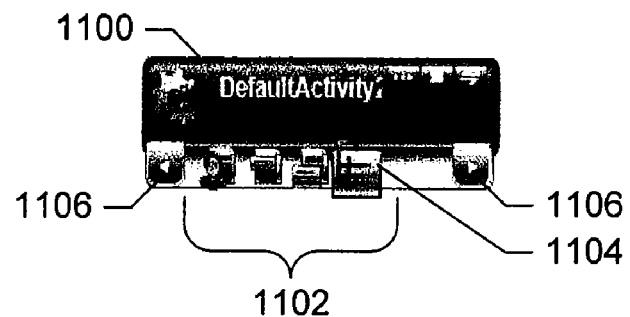
FIG. 11 is a screenshot of an example activity strip.

Each step in the graphical representation of process preferably includes an activity strip. An example activity strip 1100 is illustrated in FIG. 11. In this example, the activity strip 1100 includes one or more event icons 1102 that represent the events associated with the process step. For example, the user may drag a send e-mail event into a process step. In such an instance, an e-mail event icon 1104 is added to the activity strip 1100. If the number of event icons 1102 exceeds the width of the activity strip 1100, the user may scroll through event icons using arrow buttons 1106.

Figure 12:
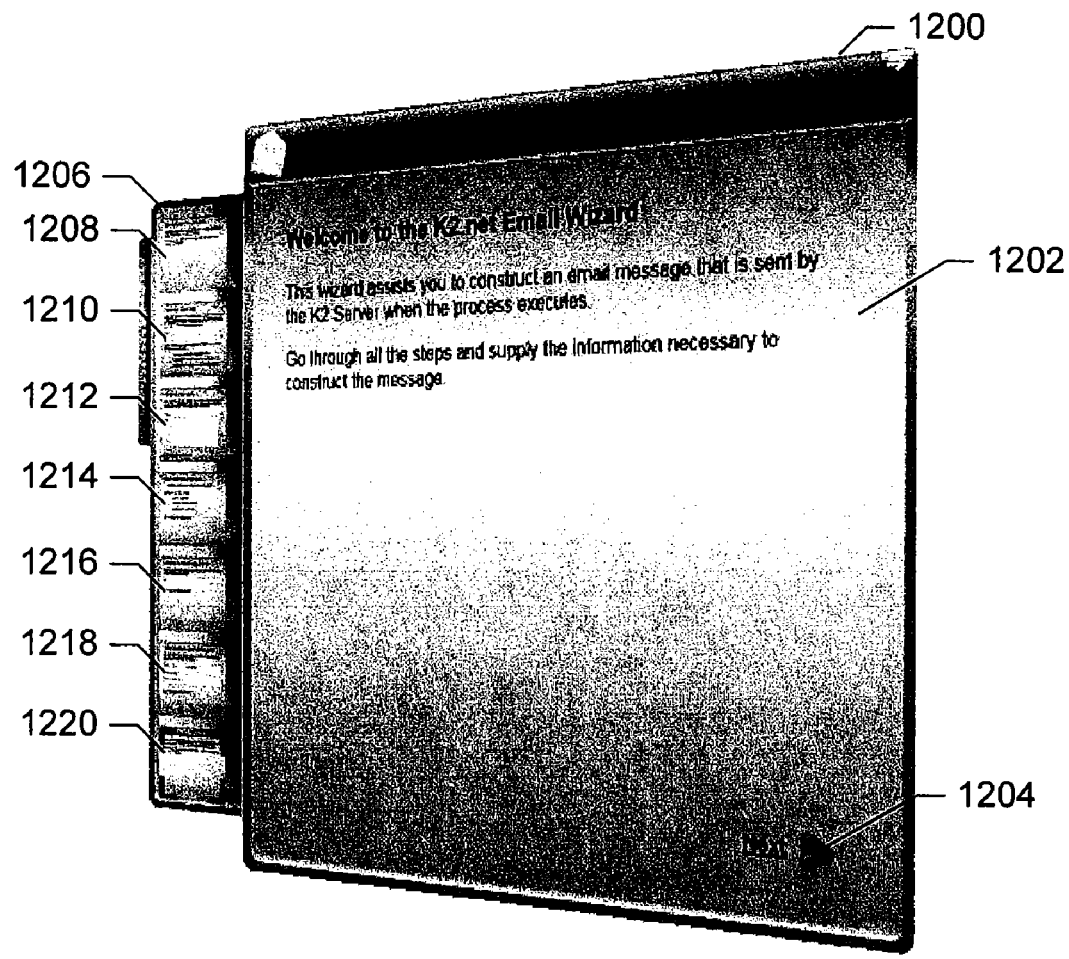
FIG. 12 is a screenshot of an example setup wizard in a partially rotated state.
Figure 13:
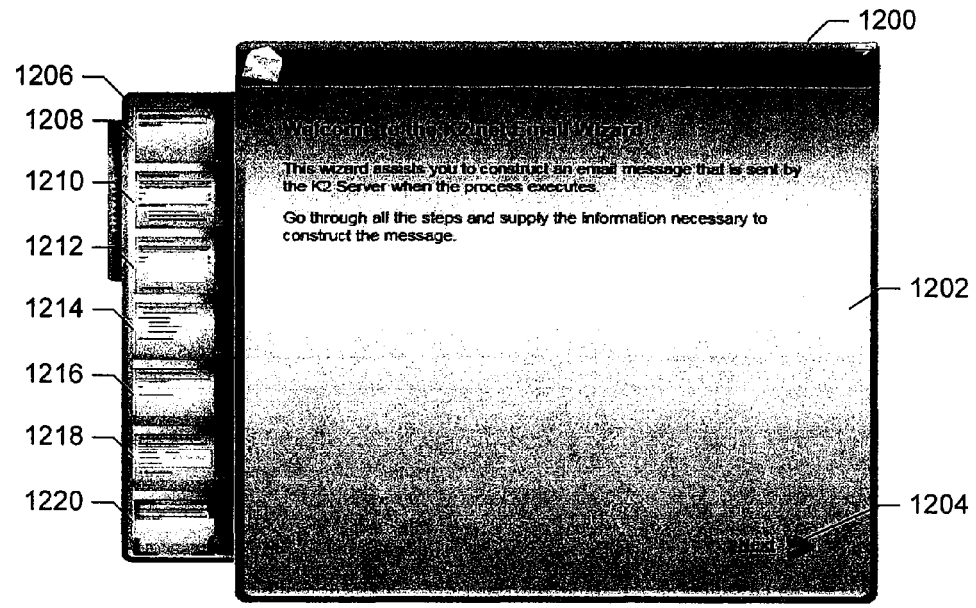
FIG. 13 is a screenshot of the example setup wizard in a fully rotated state.

When a particular event icon 1102 is selected, the user is shown a setup wizard to configure that portion of the process. Preferably, each step in a process is presented as a cube to the user, and the setup wizard is swiveled into view to create an effect of a single entity that the user is working on. For example, when a user presses the e-mail event icon 1104, the activity strip 1100 rotates into an e-mail event setup wizard 1200. A partially rotated view of an example e-mail event setup wizard 1200 is illustrated in FIG. 12. A fully rotated view of the same setup wizard 1200 is illustrated in FIG. 13. The e-mail setup wizard 1200 may be used to design dynamically constructed e-mails used by one or more workflow processes. For example, the notification step 1006 of the approval process 1000 illustrated in FIG. 10 includes an output 814 that may be an automatic e-mail message. The e-mail setup wizard 1200 may be used to design how that e-mail message is constructed.

Preferably, the setup wizard 1200 includes a main display portion 1202 and a next button 1204. The main display portion 1202 displays one page of the setup wizard 1200. The next button 1204 advances the main display portion 1202 to the next page of the setup wizard 1200. A previous button (not shown) changes the main display portion 1202 to display the previous page of the setup wizard 1200.

The setup wizard 1200 also includes a page palette 1206. The page palette 1206 includes a plurality of thumbnails 1208 to 1220. Each of the thumbnails 1208 to 1220 represents one of the pages in the setup wizard 1200. The user may quickly jump to any page in the setup wizard 1200 by clicking the associated thumbnail. When a user jumps to a particular page in the setup wizard 1200, the main display portion 1202 is redrawn to reflect that page.

Figure 14:
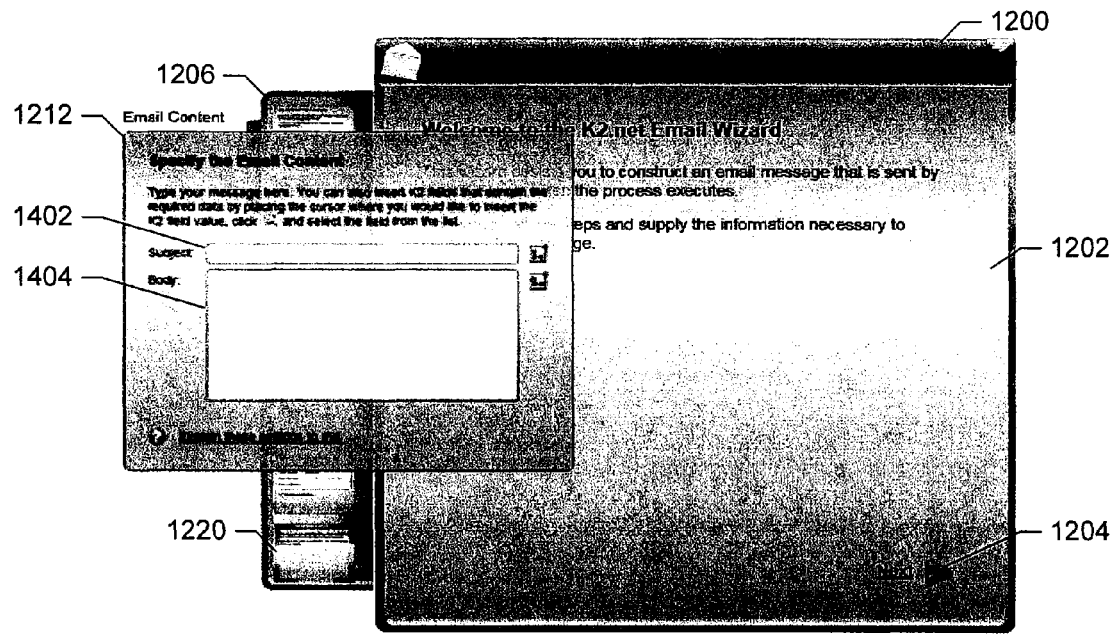
FIG. 14 is a screenshot of the example setup wizard with a popup window.

In addition, the user may quickly view a popup of any page in the setup wizard 1200 without jumping to that page (i.e., without drawing the page contents in the main display portion 1202) by hovering a cursor over the associated thumbnail. For example, the third page 1212 of the example e-mail setup wizard 1200 is displayed as a popup in FIG. 14. In this example, the third page 1212 of the setup wizard 1200 includes a subject input box 1402 and a body input box 1404. The subject input box 1402 of the e-mail setup wizard 1200 is used to define the subject line of the automatic e-mail. The body input box 1404 of the e-mail setup wizard 1200 is used to define the body of the automatic e-mail. Any values entered into a page of the process setup wizard 1200 are visible in the popup view. For example, if the user had entered "Approval Report" in the subject input box 1402 of the third page 1212 of the e-mail setup wizard 1200, "Approval Report" would be visible in the subject input box 1402 of the popup window. In this manner, the user can enter values on different pages of the setup wizard 1200 that are consistent with other entries without the need to remember those other entries and/or leave the current page.

Figure 15:
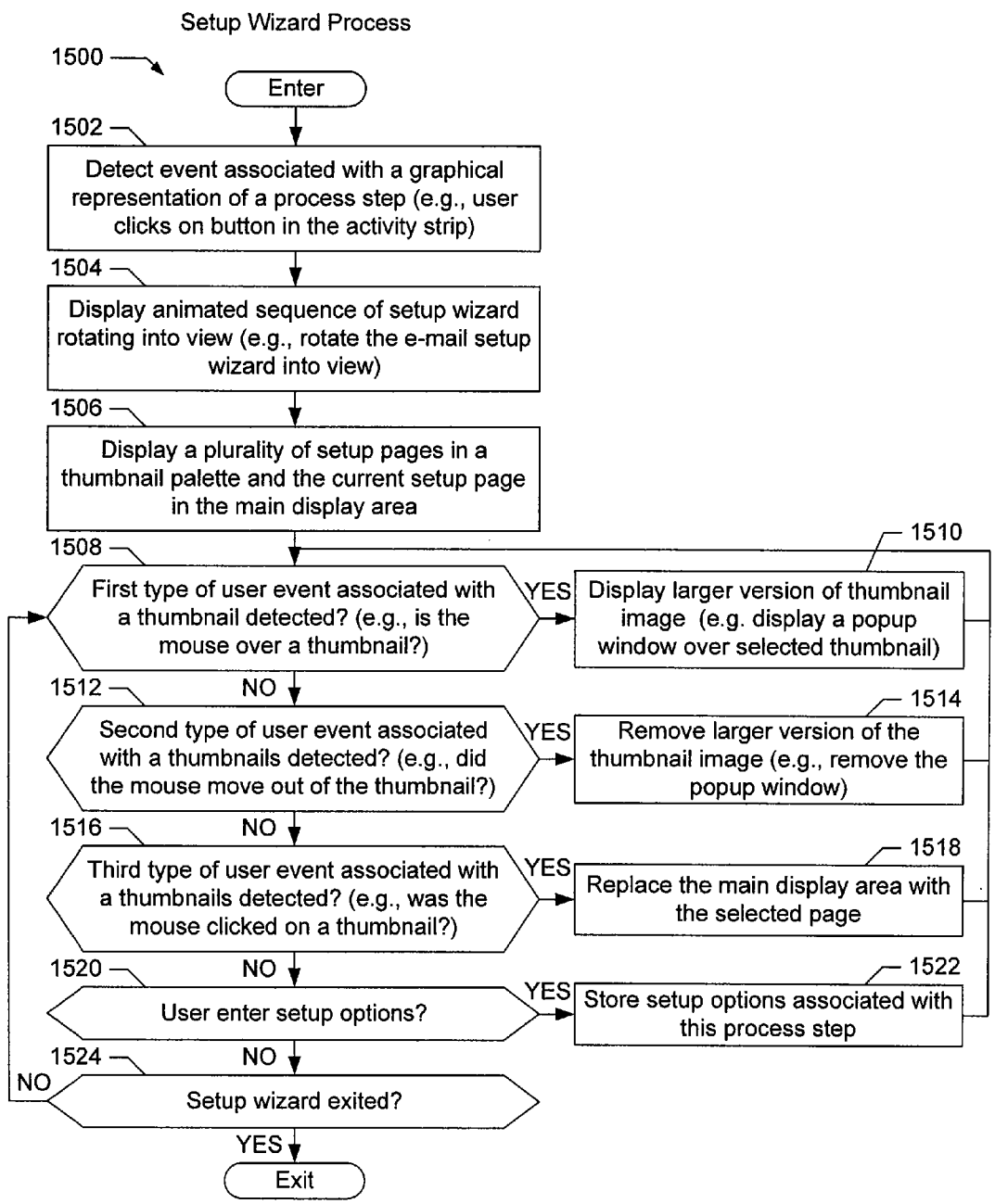
FIG. 15 is a flowchart of an example setup wizard process.

A flowchart of an example setup wizard process 1500 is illustrated in FIG. 15. Preferably, the setup wizard process 1500 is embodied in one or more software programs which is stored in one or more memories and executed by one or more processors. Although the setup wizard process 1500 is described with reference to the flowchart illustrated in FIG. 15, it will be appreciated that many other methods of performing the acts associated with setup wizard process 1500 may be used. For example, the order of many of the steps may be changed, and some of the steps described may be optional.

The process 1500 begins when a client device 102 detects an event associated with a graphical representation of a process step 1008 (block 1502). For example, the user may click on a setup button in the activity strip 1100. In response, the client device 102 causes an animated sequence to be displayed (block 1504). For example, the client device may display the activity strip rotating in three dimensions to show an e-mail setup wizard "side" of a cube. In this manner, the user is given visual feedback that the two objects (e.g., the activity strip 1100 and the e-mail setup wizard 1200) are related.

The setup wizard includes a plurality of setup pages in a thumbnail palette 1206 and a current setup page in a main display portion 1202 (block 1506). For example, the first page of an e-mail setup wizard may ask the user to enter the e-mail address of the recipient and the subject of the e-mail message. While the client device 102 is displaying setup wizard pages and receiving setup information from the user, the client device 102 is also looking for a plurality of events such as mouse movements and mouse clicks.

If a first type of event associated with one of the thumbnail images 1208-1220 is detected (block 1508), the client device 102 preferably displays a larger version of the associated thumbnail image (block 1510). For example, if the user moves the mouse cursor over a particular thumbnail image 1208-1220, a popup window 1212 showing a larger version of that thumbnail image may be displayed. Preferably, the larger version of the thumbnail image is a separate window 1212 that is smaller than the main display portion 1202 (see FIG. 14). However, any type of suitable image may be used. For example, the larger version of the thumbnail image may "temporarily" replace the main display portion 1202.

If a second type of event associated with one of the thumbnail images 1208-1220 is detected (block 1512), the client device 102 preferably removes the larger version of the associated thumbnail image (block 1514). For example, if the user moves the mouse cursor out of a particular thumbnail image, the popup window showing the larger version of that thumbnail image may be removed. If the larger version of the thumbnail image is a separate window, that window is removed from the display the content "beneath" the removed window is redraw. If the larger version of the thumbnail image replaced the main display portion 1202, then the previous contents of the main display portion 1202 (e.g., the current setup page) is redraw in the main display portion 1202.

The larger version of the thumbnail image also shows any setup information previously entered by the user. For example, if the user entered the recipients e-mail address on the first page of the setup wizard, moved to another page of the setup wizard, and then wanted to recall the entered e-mail address without scrolling all the way back to the first page, the user may simply roll the mouse over the first thumbnail to recall the entered information.

If a third type of event associated with one of the thumbnail images 1208-1220 is detected (block 1516), the client device 102 preferably replaces the main display image with a full size version of the associated thumbnail image (block 1518). For example, if the user clicks the mouse on a particular thumbnail image, the main display portion 1202 preferably jumps to that page in the setup wizard. Unlike the mouse over example, removing the mouse from the thumbnail does not revert the main display portion 1202 to the previous page (i.e., the user has moved to that setup page as opposed to just temporally reviewing that setup page).

At any time, the user may enter one or more setup options (block 1520), and the setup options are stored (block 1522). If the user exits the setup wizard (block 1524), the process 1508-1520 of checking for user actions and setup options repeats.

In summary, persons of ordinary skill in the art will readily appreciate that inventive methods and apparatus related to automated workflows and forms have been disclosed. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention is claimed as follows:

1. A method of storing data associated with an electronic form, wherein the electronic form interacts with a business object, the method comprising:
   retrieving a first data field from a first data source, the first data source having a first protocol;
   retrieving a second data field from a second data source, the second data source having a second protocol, the second protocol being different than the first protocol;
   providing a graphical user interface where the first data field and the second data field are to be combined in the electronic form;
   allowing a third data field to be added to the form through the graphical user interface, wherein adding the third data field automatically changes a definition of the business object; and
   storing data indicative of the third field in a third data source, the third data source having a third protocol, the third protocol being different than the first protocol, the third protocol being different than the second protocol, wherein the first, second, and third data fields are part of a single business object.

2. The method of claim 1, wherein the first data source and the first protocol are associated with a first legacy system, and the second data source and the second protocol are associated with a second legacy system, the first legacy system being different than the second legacy system.

3. The method of claim 1, wherein storing the data indicative of the third field in the third data source includes storing the data indicative of the third field in a declarative format.

4. The method of claim 3, wherein the declarative format includes an Extensible Markup Language (XML).

5. The method of claim 1, including storing a function associated with the electronic form, the method comprising:
   receiving a definition of the function via a graphical user interface, wherein at least one parameter in the function is defined by selecting a graphical representation of the parameter, the graphical representation of the parameter being associated with the electronic form;
   generating a structure portion based on the received definition of the function, the structure portion defining the function;
   generating a user interface portion associated with the structure portion, the user interface portion defining a user interface to be used to test the function;
   combining the structure portion and the user interface portion to form a function snippet; and
   storing the function snippet in a computer readable memory.

6. The method of claim 1, including modifying the electronic form based on a role associated with a user.

7. The method of claim 1, including updating a plurality of data fields in the electronic form by:
   detecting an event associated with an update at a client device;
   sending a method call from the client device to a broker server in response to detecting the event, the method call using the third protocol; and
   receiving data from the first broker server using the third protocol.

8. The method of claim 1, including designing a workflow process to use the electronic form by:
   placing a first object and a second object on a first computer based design canvas to create a resource map, the first object being indicative of a first business resource, the second object being indicative of a second different business resource;
   connecting the first object to the second object with an arrow, the arrow being indicative of the workflow process;
   associating a second computer based design canvas with the arrow; and
   placing a plurality of objects on the second computer based design canvas to create a process map, each object in the plurality of objects being indicative of a step in the workflow process.

9. The method of claim 1, including designing a workflow process to use the electronic form by:
   placing a first object and a second object on a first computer based design canvas to create a process map, the first object being indicative of a first process step, the second object being indicative of a second process step;
   connecting the first object to the second object with an arrow, the arrow being indicative of a progression from the first process step to the second process step; and
   creating a third object and a fourth object, the third object and the fourth object each being indicative of the first process step, the first object representing a parent object, the third object representing a first child object to the parent object, the fourth object representing a second different child object to the parent object, wherein the parent object includes a plurality of global properties and the first child object inherits a subset of the global properties.

10. The method of claim 1, including designing a workflow process to use the electronic form by:
    placing a plurality of objects on a computer based design canvas at a first client device to create a workflow representation;
    sharing at least a portion of the workflow representation with a second different client device via a network;
    exchanging messages associated with the portion of the workflow representation between the first client device and the second client device; and
    storing data indicative of the messages in association with storing data indicative of the workflow representation.

11. The method of claim 1, including displaying a setup sequence associated with the electronic form by:
    displaying a plurality of thumbnail images in a first area of a display, each of the thumbnail images representing a step in the setup sequence;
    displaying a full image in a second area of the display, the full image representing one of the steps in the setup sequence;
    detecting a first event associated with a thumbnail image in the plurality of thumbnail images; and
    displaying a popup image in response to detecting the first event, the popup image being a larger version of the thumbnail image associated with the first event.

12. The method of claim 1, including displaying a setup sequence associated with the electronic form by:
    displaying a graphical object indicative of a step in a workflow process that uses the combined business object;
    detecting an event associated with the graphical object;
    displaying an animation of the graphical object rotating in three dimensions in response to detecting the event associated with the graphical object;
    displaying a setup sequence associated with the step in the workflow process; and
    receiving configuration parameters associated with the step in the workflow process.

13. A computer readable memory storing instructions for generating data associated with an electronic form that interacts with a business object, the instructions to cause a computing device to:
    retrieve a first data field from a first data source, the first data source having a first protocol;
    retrieve a second data field from a second data source, the second data source having a second protocol, the second protocol being different than the first protocol;
    provide a graphical user interface where the first data field and the second data field are to be combined in the electronic form;
    allow a third data field to be added to the form through the graphical user interface wherein adding the third data field automatically changes a definition of the business object; and
    generate data indicative of the third field for a third data source, the third data source having a third protocol, the third protocol being different than the first protocol, the third protocol being different than the second protocol, wherein the first, second, and third data fields are part of a single business object.

14. The computer readable memory of claim 13, wherein the data indicative of the third field in the third data source is in a declarative format.

15. The computer readable memory of claim 13, wherein the instructions are structured to cause the computing device to store a function associated with the electronic form by:
- receiving a definition of the function via a graphical user interface, wherein at least one parameter in the function is defined by selecting a graphical representation of the parameter, the graphical representation of the parameter being associated with the electronic form;
- generating a structure portion based on the received definition of the function, the structure portion defining the function;
- generating a user interface portion associated with the structure portion, the user interface portion defining a user interface to be used to test the function;
- combining the structure portion and the user interface portion to form a function snippet; and
- storing the function snippet in a computer readable memory.

16. The computer readable memory of claim 13, wherein the instructions are structured to cause the computing device to generate a workflow process to use the electronic form by:
- placing a first object and a second object on a first computer based design canvas to create a resource map, the first object being indicative of a first business resource, the second object being indicative of a second different business resource;
- connecting the first object to the second object with an arrow, the arrow being indicative of the workflow process;
- associating a second computer based design canvas with the arrow; and placing a plurality of objects on the second computer based design canvas to create a process map, each object in the plurality of objects being indicative of a step in the workflow process.

17. The computer readable memory of claim 13, wherein the instructions are structured to cause the computing device to generate a workflow process to use the electronic form by:
- placing a first object and a second object on a first computer based design canvas to create a process map, the first object being indicative of a first process step, the second object being indicative of a second process step;
- connecting the first object to the second object with an arrow, the arrow being indicative of a progression from the first process step to the second process step; and
- creating a third object and a fourth object, the third object and the fourth object each being indicative of the first process step, the first object representing a parent object, the third object representing a first child object to the parent object, the fourth object representing a second different child object to the parent object, wherein the parent object includes a plurality of global properties and the first child object inherits a subset of the global properties.

18. The computer readable memory of claim 13, wherein the instructions are structured to cause the computing device to generate a workflow process to use the electronic form by:
- placing a plurality of objects on a computer based design canvas at a first client device to create a workflow representation;
- sharing at least a portion of the workflow representation with a second different client device via a network;
- exchanging messages associated with the portion of the workflow representation between the first client device and the second client device; and
- storing data indicative of the messages in association with storing data indicative of the workflow representation.

* * * * *